United States Patent
Tu et al.

(10) Patent No.: US 7,953,246 B1
(45) Date of Patent: May 31, 2011

(54) SYSTEMS AND METHODS FOR MOTION RECOGNITION WITH MINIMUM DELAY

(75) Inventors: Xiaoyuan Tu, Sunnyvale, CA (US); Yoichiro Kawano, San Jose, CA (US); Charles Musick, Jr., Belmont, CA (US); William Robert Powers, III, San Francisco, CA (US); Stuart Reynolds, Mountain View, CA (US); Dana Wilkinson, Mountain View, CA (US); Ian Wright, Sunnyvale, CA (US); Wei Yen, Seattle, WA (US)

(73) Assignee: AiLive Inc., Mountain View, CA (US)

( * ) Notice: Subject to any disclaimer, the term of this patent is extended or adjusted under 35 U.S.C. 154(b) by 0 days.

(21) Appl. No.: 12/875,146

(22) Filed: Sep. 3, 2010

Related U.S. Application Data

(63) Continuation of application No. 12/709,520, filed on Feb. 22, 2010, which is a continuation-in-part of application No. 11/486,997, filed on Jul. 14, 2006, now Pat. No. 7,702,608.

(51) Int. Cl.
*G06K 9/00* (2006.01)
(52) U.S. Cl. ............ 382/103; 382/159; 463/36; 463/37; 463/38; 463/39
(58) Field of Classification Search .................. 382/103, 382/159; 463/36, 37, 38, 39; 702/104, 127, 702/153
See application file for complete search history.

(56) References Cited

U.S. PATENT DOCUMENTS

| | | | |
|---|---|---|---|
| 7,421,369 B2 * | 9/2008 | Clarkson | 702/150 |
| 7,774,155 B2 * | 8/2010 | Sato et al. | 702/127 |
| 2005/0219213 A1 * | 10/2005 | Cho et al. | 345/158 |
| 2008/0055248 A1 * | 3/2008 | Tremblay et al. | 345/158 |
| 2009/0209343 A1 | 8/2009 | Foxlin et al. | |
| 2010/0113153 A1 * | 5/2010 | Yen et al. | 463/37 |
| 2011/0034251 A1 * | 2/2011 | Cohen et al. | 463/39 |

* cited by examiner

*Primary Examiner* — Vu Le
*Assistant Examiner* — Amara Abdi
(74) *Attorney, Agent, or Firm* — Joe Zheng

(57) ABSTRACT

Techniques for performing motion recognition with minimum delay are disclosed. A processing unit is provided to receive motion signals from at least one motion sensing device, where the motion signal describes motions made by a user. The processing unit is configured to access a set of prototypes included in a motion recognizer to generate corresponding recognition signals from the motion signals in response to the motion recognizer without considering one or more of the prototypes completely in the motion recognizer. Movements of at least one of the objects in a virtual interactive environment is responsive to the recognition signals such that feedback from the motions to control the one of the objects is immediate and substantially correct no matter how much of the motion signals have been received.

20 Claims, 7 Drawing Sheets

SYSTEMS AND METHODS FOR MOTION RECOGNITION WITH MINIMUM DELAY

CROSS REFERENCE TO RELATED APPLICATIONS

This is a continuation of co-pending U.S. application Ser. No. 12/709,520, entitled "Systems and methods for personalized motion control", filed on Feb. 22, 2010, which is a continuation-in-part of U.S. application Ser. No. 11/486,997, entitled "Generating Motion Recognizers for Arbitrary Motions", filed Jul. 14, 2006 now U.S. Pat. No. 7,702,608, and co-pending U.S. application Ser. No. 12/020,431, entitled "Self-Contained Inertial Navigation System for Interactive Control Using Movable Controllers", filed Jan. 25, 2008.

BACKGROUND OF THE INVENTION

1. Field of the Invention

The invention generally relates to the area of artificial intelligence, and more particularly, relates to machine learning, especially in the context of generating motion recognizers from example motions. In some embodiments, recognizer makers can be incorporated into, or used alongside of end-user applications, where end users can create ad-hoc personalized motion recognizers for use with those end-user applications.

2. Related Art

Our ability to fulfill the promise of freeform human motion control of software applications is strictly limited by our ability to detect and recognize what a given human is trying to do. Broadly speaking, the most interesting motion control possibilities come from interpreting the following human "devices": fingers, hands, facial expressions, and movements of head, shoulders, torso, and legs. Humans are very good at interpreting the gestures and expressions of other humans, but are yet unable to create machines or code that can perform at a similar level.

Writing program code to recognize whether a supplied motion is an example of an existing set of known motion classes is difficult. In part, this is because there are many sources of specialized motion data to operate on, each with a relatively small body of public knowledge on practical methods for processing such data, each with different semantic interpretations and operational ranges, and none of which reflect the anthropological information any competent human could pick up. The resulting motion data is often complicated and counterintuitive. For example, when presented with a simple graph of 3D accelerometer outputs versus time, people skilled in the art struggle to determine what gesture that time series of data corresponds to. Even the simpler task of selecting which motion graphs belong to the same gesture confounds most experts presented with the problem. The problem is exacerbated by sensor noise, device differences, and the fact that data for the same gesture can appear quite different when performed by different people with different body types and musculatures, or even by the same person at different times. It is a difficult challenge under these conditions for one skilled in the art to build effective motion recognizers.

Along with challenging source data, the fact that the data is dynamic over time, not static over time, is a significant hurdle to overcome. Freeform human motion, in the general sense, is characterized by movement over time, and subsequent motion recognition must be characterized by computation over time series data. The typical pattern recognition or gesture recognition approach of computing a large number of static features based on one step in time, then carrying out discrimination-based recognition, is not relevant to this invention.

A third characteristic of freeform human motion that poses a significant challenge for automated motion recognition systems is the desire to allow every individual user to create and personalize their own "ad-hoc" (i.e. not predefined) motion recognizers. The prior art contains many examples of algorithms that experts in the field can apply to specific predefined sets of gestures for static recognition. The ability to use a predefined set of gestures means a vast number of practical corners can be cut. For example, classifier construction times can be days or weeks. Training data can contain millions of examples. Biases can be built in that work fine for 3-5 different classes but fail outside that range. Characteristics specific to the predefined set of classes can be hard coded into the algorithm and the corresponding parameters. Broadly speaking, the ability to do classification over a small number of predefined classes has little or no bearing on the ability to do ad-hoc motion recognition. To our knowledge, there is nothing in the prior art that provides teaching related to end-user creation of ad-hoc motion recognizers.

In previous work, such as Kjeldson [3], systems and methods are described for taking a collection of static images of a hand, constructing a large collection of static features describing that image, and building a classifier with tools like neural networks that can recognize subsequent static images. This work is not relevant to building ad-hoc motion recognizers. First, Kjeldson's input data is static image data. There is no time component and no mixed mode inputs. Techniques that work for static classification problems do not apply to freeform human motion control. Additionally, Kjeldson [3] focuses on techniques that could be applied by one skilled in the art to construct a classifier that will differentiate between a preconceived collection of static images. However, it is highly desirable to allow those unskilled in the art to be able to create classifiers that will recognize ad-hoc sets of gestures that are not preconceived.

In previous work such as Kwon [4], systems and methods are described for creating a trainer/trainee session where hidden Markov models are built representing trainer motions, and used to recognize incoming trainee motions. This approach relies on error rates of 40-60% being acceptable for the trainee. Most applications, however, such as computer video games, require success rates of upwards of 95%. Furthermore, the methods described in Kwon [4] require three components in the training signals: a start position; a motion; and an end position. This approach does not work in applications that wish to provide freeform motion control, since the starting and ending positions are not predefined, and can not reasonably be quantized a priori without making the construction of a reasonable training set a virtual impossibility.

The teachings in the present invention take the unprecedented step of giving unskilled end users the ability to create ad-hoc personalized recognizers for use in various applications. The incoming data is a broad mix of motion signals over time with no predefined gestures, no constraints on how to execute them, and no predefined starting poses or stopping poses. There is no coding involved in building the motion recognizers. End users can create any motion recognizer they choose, simply by giving examples. Objects, features, and advantages of the present invention will become apparent upon examining the following detailed description.

The detail of the references hereby incorporated by reference as if fully set forth herein includes.

[1]. E. Keogh and M. Pazzani, Derivative Dynamic Time Warping, in First SIAM International Conference on Data Mining, (Chicago, Ill., 2001);

[2]. Lawrence R. Rabiner, A Tutorial on Hidden Markov Models and Selected Applications in Speech Recognition. Proceedings of the IEEE, 77 (2), p. 257-286, February 1989;

[3]. R. Kjeldson and J. Kender, Towards the Use of Gesture in Traditional User Interfaces, Proceedings of the $2^{nd}$ International Conference on Automatic Face and Gesture Recognition) 1996; and

[4]. D. Kwon and M. Gross, Combining Body Sensors and Visual Sensors for Motion Training, ACM SIGCHI ACE 2005.

SUMMARY OF INVENTION

This section summarizes some aspects of the present invention and briefly introduces some preferred embodiments. Simplifications or omissions in this section as well as in the abstract or the title of this description may be made to avoid obscuring the purpose of this section, the abstract and the title. Such simplifications or omissions are not intended to limit the scope of the present invention.

Generally speaking, the present invention pertains to end users generating and using motion recognizers from example motions. According to one aspect of the present invention, techniques are provided for an end user not skilled in the art to create ad-hoc personalized motion recognizers that can be embedded in applications that run on a host computing unit. Subsequently, the host computing unit is configured to readily recognize motions based on the embedded motion recognizers. In addition, the motion recognizers may be constantly updated, tuned or refined to expand their abilities to recognize more motions.

According to another aspect of the present invention, motion recognizers created by end users are configured to perform motion recognition on motion signals from one or more of a wide range of motion sensitive devices characterizing end user motions, recognition signals from the motion recognition are used to interact with an application in reference to a display. The motion signals are also used to create new motion recognizers, and could also be used to update or tune the already created motion recognizers.

The present invention may be implemented in different forms including an apparatus, a system or a part of a system, a software module in a computer readable medium. According to one embodiment, the present invention is a method for creating and using motion recognizers. The method comprises:

receiving a training set created by an end user without reference to a predefined set of allowed motions, the training set including a first set of motion signals characterizing at least one type of motion executed over some period of time;

constructing at least one of the motion recognizers automatically from the training set, wherein:

(1) substantially all parameters needed to create the motion recognizers that are ad-hoc and perform motion recognition, are determined automatically;

(2) means to influence which moves are recognizable is to add new examples of motions to or subtract some of the motion signals from the training set; and performing motion recognition with the at least one of the motion recognizers by classifying a second set of motion signals while some or all of the second set of motion signals are used to update the motion recognizers or create additional motion recognizers.

According to another embodiment, the present invention is a system for creating and using motion recognizers. The system comprises:

at least one hand-held motion sensing device producing a first set of motion signals;

a memory space for storing at least one motion recognizer that is ad-hoc, and at least one training set created by an end user without reference to a predefined set of allowed motions, the training set including a second set of motion signals characterizing at least one motion executed over some period of time; and a first processing unit with a recognizer maker that is configured to automatically build the at least one motion recognizer from the at least one training set; and a second processing unit that receives the motion signals from the at least one hand-held motion sensing device, and executes a recognition runtime library which, responsive to the at least one motion recognizer, computes a motion label for the motion signals.

According to yet another embodiment, the present invention is a method for creating motion recognizers, the method comprises:

receiving a training set of a first set of motion signals characterizing at least one type of motion executed over some period of time;

constructing at least one motion recognizer automatically from the training set, wherein when used by a recognition runtime library, the motion recognizers support motion recognition on a second set of motion signals); and computing automatically from the training set at least one of:

(1) a set of slack parameters, which is used to control per-class classification tolerances of the motion recognizer without adding or deleting motion signals from the training set, as a function of (i) overall classification rates, (ii) a difference in per-class classification rates, or (iii) a desired "undetermined" classification rate;

(2) a capacity parameter, which is used to control a recognition capacity of the motion recognizer, as a function of (i) number of classes of the motion recognizer, (ii) required classification rates of each class, or (iii) a desired "undetermined" classification rate;

a confusion matrix, which is used to guide an interactive use of a recognizer maker by indicating which motion classes in the training set need to be updated with new motion signals or redesigned completely.

According to yet another embodiment, the present invention is a system for creating motion recognizers, the system comprises:

at least one motion sensing device producing a first set of motion signals;

a memory space for storing at least one motion recognizer, and at least one training set including a second set of motion signals characterizing at least one motion executed over some period of time; and a first processing unit that receives the first set of motion signals from the at least one motion sensing device, and executes a recognition runtime library which, responsive to the at least one motion recognizer, computes a motion label for the first set of motion signals; and a second processing unit with a recognizer maker configured to automatically build the at least one motion recognizer from the at least one training set and additionally computes automatically from the training set at least one of:

(1) a set of slack parameters, which is used to control per-class classification tolerances of the motion recognizer without adding or deleting any of the second set of motion signals from the training set, as a function of (i) overall classification rates, (ii) a difference in per-class classification rates, or (iii) a desired "undetermined" classification rate;

(2) a capacity parameter, which is used to control recognition capacity of the motion recognizer, as a function of (i) number of classes of the motion recognizer, (ii) required classification rates of each class, or (iii) a desired "undetermined" classification rate;

a confusion matrix, which is used to guide interactive use of the recognizer maker by indicating which motion classes in the training set need to be updated with new motion signals or redesigned completely.

According to yet another embodiment, the present invention is a method for creating motion recognizers, the method comprises:

receiving motion signals as a training set of data from one or more motion sensitive devices, each of the motion signals characterizing at least one type of motion executed over some period of time;

recording and retaining an envelope of data for each of the motion signals including data before a start and after an end of the motion characterized in each of the motion signals;

analyzing each of the motion signals to build a motion start classifier that predicts the start of a motion based on features including differences in motion signal activities before, during and after the start of each of the motion signals in the training set; and labeling an incoming motion signal stream automatically with a motion start when the motion start classifier indicates a motion has started.

According to still another embodiment, the present invention is a method for creating motion recognizers, the method comprises receiving a motion recognizer built from a training set composed of a first set of motion signals characterizing at least one type of motion executed over some period of time with a motion sensing device, wherein the motion signals include sufficient information to compute position and orientation over time of the motion sensing device;

receiving a second set of motion signals from a second motion sensing device providing sufficient information to compute position and orientation over time of the second motion sensing device; and performing motion recognition to determine a first example motion signal in the training set most responsive to a second example in the second set of motion signals;

computing at any point in time a first 3D track of the first example motion signal, and a second 3D track of the second example motion signal; and rendering the first and second 3D tracks visually side by side, with at least a first major point of divergence between the two motions highlighted.

Many objects, features, benefits and advantages, together with the foregoing, are attained in the exercise of the invention in the following description and resulting in the embodiment illustrated in the accompanying drawings.

BRIEF DESCRIPTION OF THE DRAWINGS

These and other features, aspects, and advantages of the present invention will become better understood with regard to the following description, appended claims, and accompanying drawings where:

DETAILED DESCRIPTION

Figure 1A:
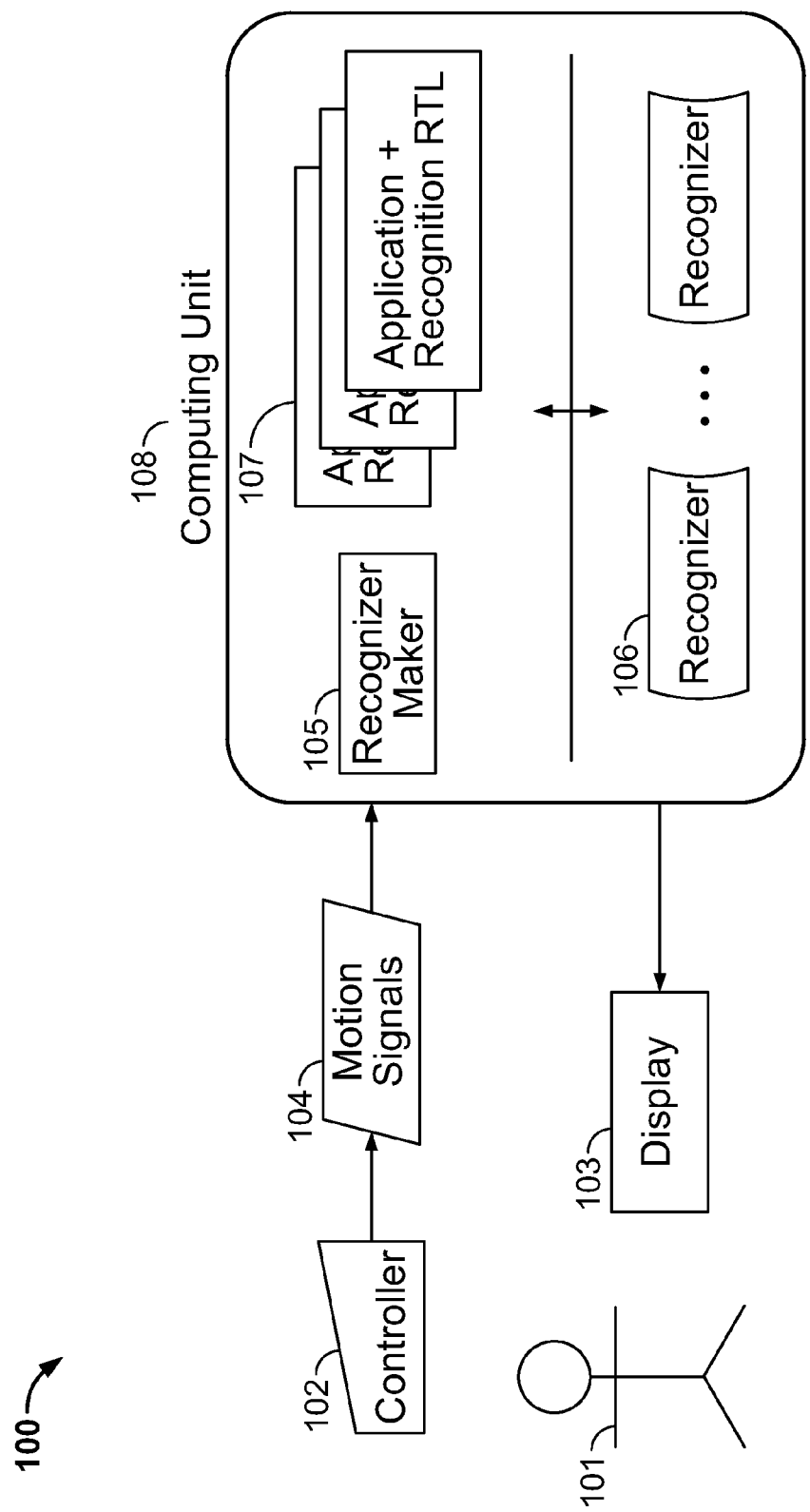
FIG. 1A shows a configuration, according to an embodiment of the invention, in which a display, a controller, and a computing unit are 3 separate devices.

The detailed description of the invention is presented largely in terms of procedures, steps, logic blocks, processing, and other symbolic representations that directly or indirectly resemble the operations of data processing devices. These process descriptions and representations are typically used by those skilled in the art to most effectively convey the substance of their work to others skilled in the art.

Numerous specific details are set forth in order to provide a thorough understanding of the present invention. However, it will become obvious to those skilled in the art that the invention may be practiced without these specific details. In other instances, well known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flow-charts or diagrams representing one or more embodiments of the invention do not inherently indicate any particular order nor imply any limitations in the invention.

For convenience, definitions for some terms are provided below. It should be noted that the definitions are to facilitate the understanding and description of the invention according to one embodiment. The definitions may appear to include limitations with respect to the embodiment. However, the actual meaning of the terms may have applicability beyond such an embodiment.

1 Definitions

Ad-Hoc motion recognizer: A motion recognizer built without a predefined notion of acceptable motions, and without a predefined notion of acceptable ways to execute those motions.

Capacity: A parameter that controls the number of prototypes allowed in a given motion recognizer. Capacity also acts as a proxy for expected memory and CPU costs of the given motion recognizer.

Classification: A process of assigning a class label, or a motion label, to an unlabelled motion signal, including the possibility that the assigned class label might be "unknown" or "undetermined". Classification might additionally assign probabilities, possibly in response to additional factors, that an unlabelled example is an example of each possible class, in which case the assigned label is the class with greatest likelihood.

Classification distance: A classification distance is a threshold specific to a given motion prototype in a specific motion class, within which the prototype might classify a motion signal as "in-class", and outside which the prototype is irrelevant to the motion signal.

Classification rate: A measure of motion recognizer performance responsive to a set of statistical measures, such as a number of false positives and false negatives.

Classifier: As used herein, this term refers to software instructions capable of being interpreted by a computing device to perform classification. It is used interchangeably with motion recognizer.

Developer: Anyone involved in the creation of an application. As used herein, this includes, but may not be limited to, a game programmer, an AI programmer, a producer, a level designer, a tester, a hired contractor, and the like.

End User: this is a user for whom an application is intended for, for example, a game player for a video game application, or a cell phone user for a cell phone.

Motion: An action or process of changing position. This includes intentional and meaningful motions, such as drawing a letter or twisting one's wrist to simulate using a screwdriver, as well as unintentional motions, such as fidgeting when bored or tense.

Motion prototype: A motion prototype is a (raw or processed) motion signal that has been chosen to be a member of a set of representative motions for some class of motion signals in a motion recognizer.

Motion recognizer: Software instructions capable of being interpreted by a computing device to carry out motion classification. The term "predictor" is used herein interchangeably with motion recognizer.

Motion signal: A motion signal is information, such as time series data that describes a motion over a period of time (see FIG. 1b as an example). The data can take many forms. For example, positions of an object over time, orientations of an object over time, accelerations experienced by an object over time, forces experienced by an object over time, data expressed in a frequency domain, data expressed in a parameterized domain such as $R^3$ or $R^4$, and the like. Motion signals are sometimes referred to as motions. A motion signal might refer herein to a processed motion signal or a raw motion signal. A raw motion signal represents data coming directly from the device driver of a motion sensitive device. A processed motion signal represents data from a motion sensitive device which has been further processed or transformed, and so is no longer in its "raw" state.

Slack: A parameter acting as a non-linear multiplier on prototype classification distances. The higher the slack is, the more likely a related prototype will be to classify a given example motion. Likewise, the lower the slack is, the less likely a prototype will classify an example motion. In one embodiment, slack is an efficient description of the classification tolerance of a given class in a motion recognizer.

Training set: A set of (raw or processed) motion signals used to generate a motion recognizer. There are a wide variety of possible forms a training set can take. As used herein, a training set is a collection of subsets of motions, with every member of a given subset sharing the same explicit or implicit label. For example, explicit class labels might be "forehand", "backhand" and "serve". If explicit labels are not available, implicit labels are instead derived based on which subset the motions belong to. For example, if the training set has 5 separate unlabeled subsets of motion signals, the implied labels for each subset of motions may be "subset 1", . . . , "subset 5", respectively.

2 Detailed Description of Embodiments

FIG. 1A shows an embodiment of the invention 100 in which the display 103, the controller 102, and the computing unit 108 are three separate devices. This setup reflects a typical computer video game system, such as the Nintendo Wii or the Sony PS3, being used to host one embodiment of this invention.

An end user 101, as defined above, is a typical consumer or end user that, by moving the controller 102, is generating motion signals that will be fed to various applications in the computing unit 108. One of the features, advantages and benefits in this invention is to provide a new capability to the end user—the ability for them to create their own unique personalized motion control interface for one or more of the applications 107 in the computing unit 108.

The controller 102 in this embodiment is a motion sensitive device containing one or more self-contained inertial sensing devices like accelerometers, gyroscopes and magnetometers. As it is moved by the end user 101, it generates a stream of motion signals 104 that are communicated to the computing unit 108.

Figure 1B:
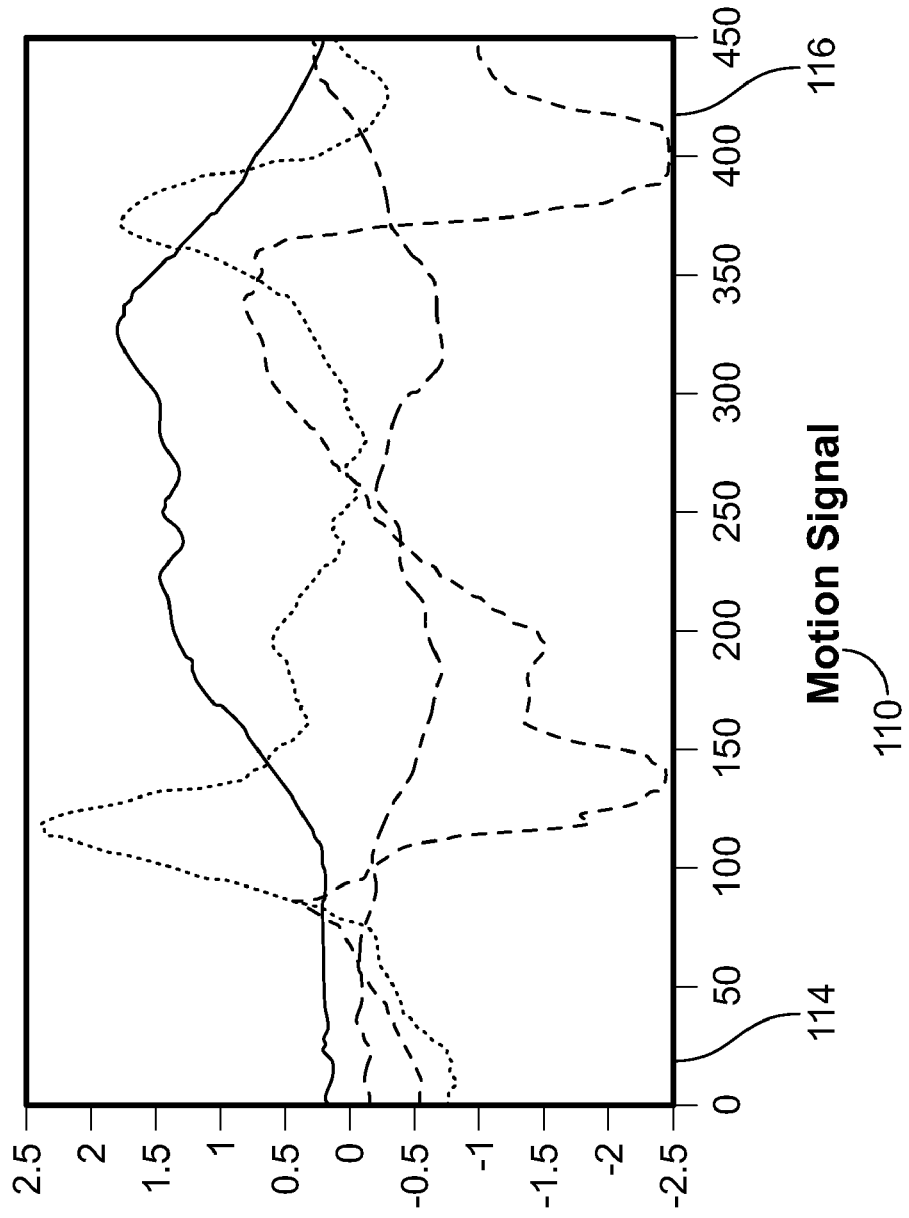
FIG. 1B shows an exemplary motion signal resulting from a player making a motion.

The motion signals 104 are the output of the controller 102, packaged in a manner to make transmission to the computing unit 108 robust and efficient (e.g., in wired or wireless manner). FIG. 1B shows an exemplary motion signal 110 resulting from a motion of a user swinging a lasso (represented by "0", from 111 to 112). The motion signal 110 shows about 400 samples, or frames of data between points 114 and 116 to swing the lasso, where the motion signal point 114 records the start of the motion 111, and the point 116 records the end of the motion 112. In this example, each frame is composed of 4 floating point numbers that represent an acceleration of the sensor(s) (and hence the controller) along a given axis at that given point in time. As a result, the motion signal 110 is time-series data representing the motion over a period of time. At times, the term "motion signal stream" is used interchangeably to convey the fact that the data from a motion sensitive device can actually be a continuous stream.

The recognizer maker 105 is a module residing in the computing unit 108. The recognizer maker 105 creates ad-hoc personalized motion recognizers for the end user. The recognizer maker 105 is configured to take the motion signals 104 as input, to update or create new recognizers 106, then update the display 103 to provide the end user 101 feedback on the recognizer creation process. The recognizer maker in this and other embodiments is meant for the end user, not the developer. It must allow the end user complete freedom as to which moves to include and how they should be executed.

According to one embodiment, applications plus recognition runtime library 107 are a collection of applications on the computing unit 108 (e.g., video games) that are each configured independently to include a motion recognition runtime library. Each application takes the motion signals 104 as part of its input, and is responsive to the one or more recognizers 106. The applications 107 update the display 103 and their internal state in a manner responsive to the motion of the end user 101. Generally, for applications like video games, motion recognizers 106 must work for millions of different players of all ages. As such, they must be robust to variations in motion signal data due to different body structures, variations in overall motion force and length, different controller grips, and changes in starting and ending orientations. All of these variations have startling impacts on the underlying motion data.

The computing unit 108, is responsible for receiving inputs from the controller 102, for storing or loading and running the recognizer maker 105, the applications 107 and the recognizers 106, and for providing the means to update the display 103.

Figure 2:
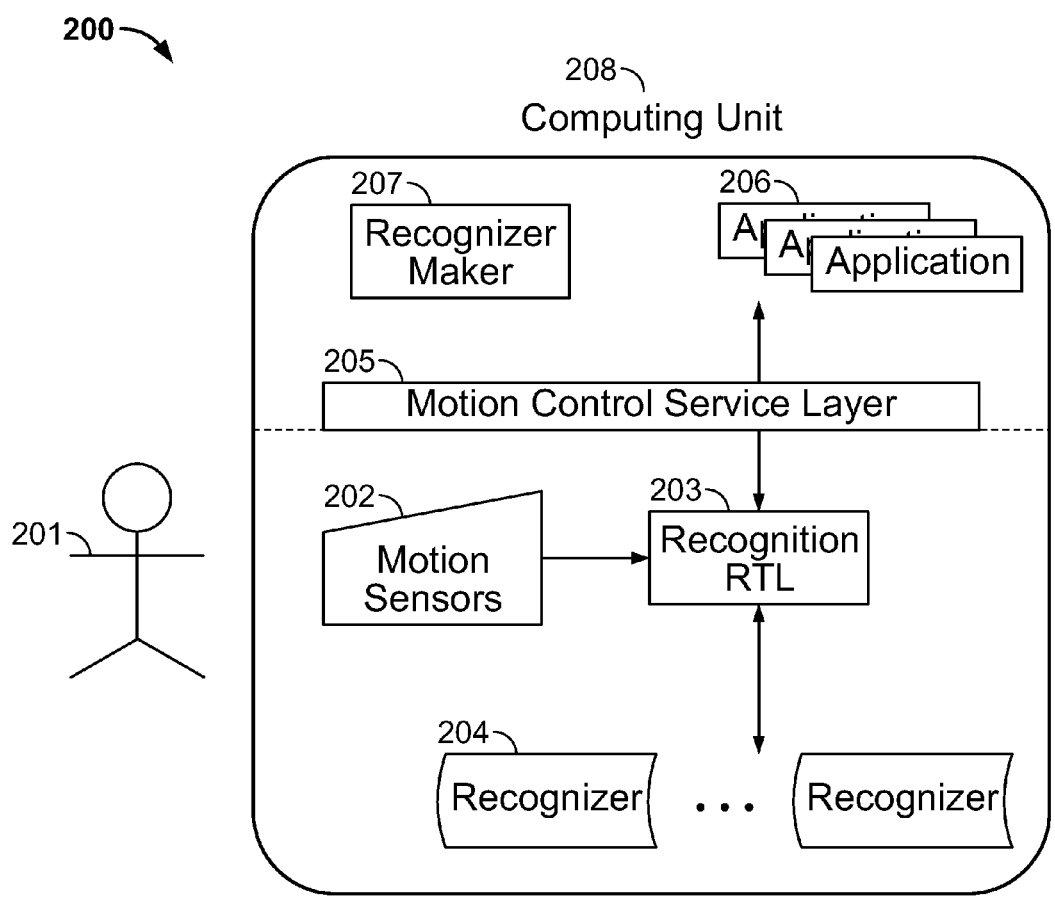
FIG. 2 shows a single device acting as a controller, where the device includes a display and a computing unit, according to another embodiment of the invention.

FIG. 2 shows an embodiment 200 of this invention in which a display, a controller and a computing unit are all integrated as a single device. This setup reflects a typical mobile system such as the Apple iPhone or the Sony PSP being used to host this invention. One of the features, advantages and benefits in the invention is to provide a capability for a user to create a unique personalized motion control interface for one or more of the applications 206 in the computing unit 208.

An end user 201, by moving the computing unit 208 that contains a set of motions sensors 202 (e.g., self-contained inertial sensors), generates motion signals that are fed to a recognition runtime library (RTL) 203 that is configured to perform motion recognition with the created motion recognizers. The motions sensors 202 are self-contained sensors that generate motion signals when the computing unit 208 is moved around, those signals get fed to the recognition runtime library 203.

The recognition run time library 203 is shared by one or more applications 206 residing on the computing unit 208, with mediation between the RTL 203, the applications 206 and the recognizer maker 207 being provided by a motion control service layer 205. The recognition RTL 203 receives a constant stream of motion signals from the motion sensors 202, and in response to one or more recognizers 204, will provide motion recognition signals and feedback to the applications 206 and the recognizer maker 207. System feedback is displayed to the end user 201 via the computing device 208.

The recognizer maker 207 is a module residing in the computing unit 208. The primary role of the recognizer maker 207 is to create ad-hoc personalized motion recognizers for the end user. It takes processed motion signals from the RTL 203, then updates or creates new recognizers 204 based on that input and/or new motion signals continuously coming from the motions sensors 202, then updates the display in the computing unit 208 to provide the end user 201 feedback on the recognizer creation process. The recognizer maker in this and other embodiments is made for the end user, not the developer; it must be able to run on the computing unit at hand for the end user; and it must allow the end user complete freedom as to which moves to include and how they should be executed.

The motion control service layer 205 provides the means for applications 206 to locate, bind, and utilize a shared motion control service being provided by the combination of sensors 202, RTL 203 and recognizers 204 for any application running on the computing unit 208. The service provided for applications 206 includes providing motion classification and other relevant signals, motion recognition tuning, and the ability to save and load new motion control interfaces made available via the recognizer maker 207.

This invention is not restricted to the specific hardware configurations described in 100 or 200. For example, the computing unit 108 and controller 102 could be a smart phone, which can be used to control the display device 103 (e.g., a television or projector). Similarly, the computing unit 108 could be a standard laptop PC connected to a monitor or a television as the display device 103, with a pencil acting as the controller 102 and a web camera tracking application providing the motion signals 104. In one embodiment, the computing device 108 and web cam are embedded in a stuffed animal or some other toy, with the controller being the child's hand as she plays with Teddy. Other applications may include a medical application for stroke rehabilitation wherein physical trainers can construct new motion control regimens for patients in the home of the patient, personalized for their specific needs.

Figure 3:
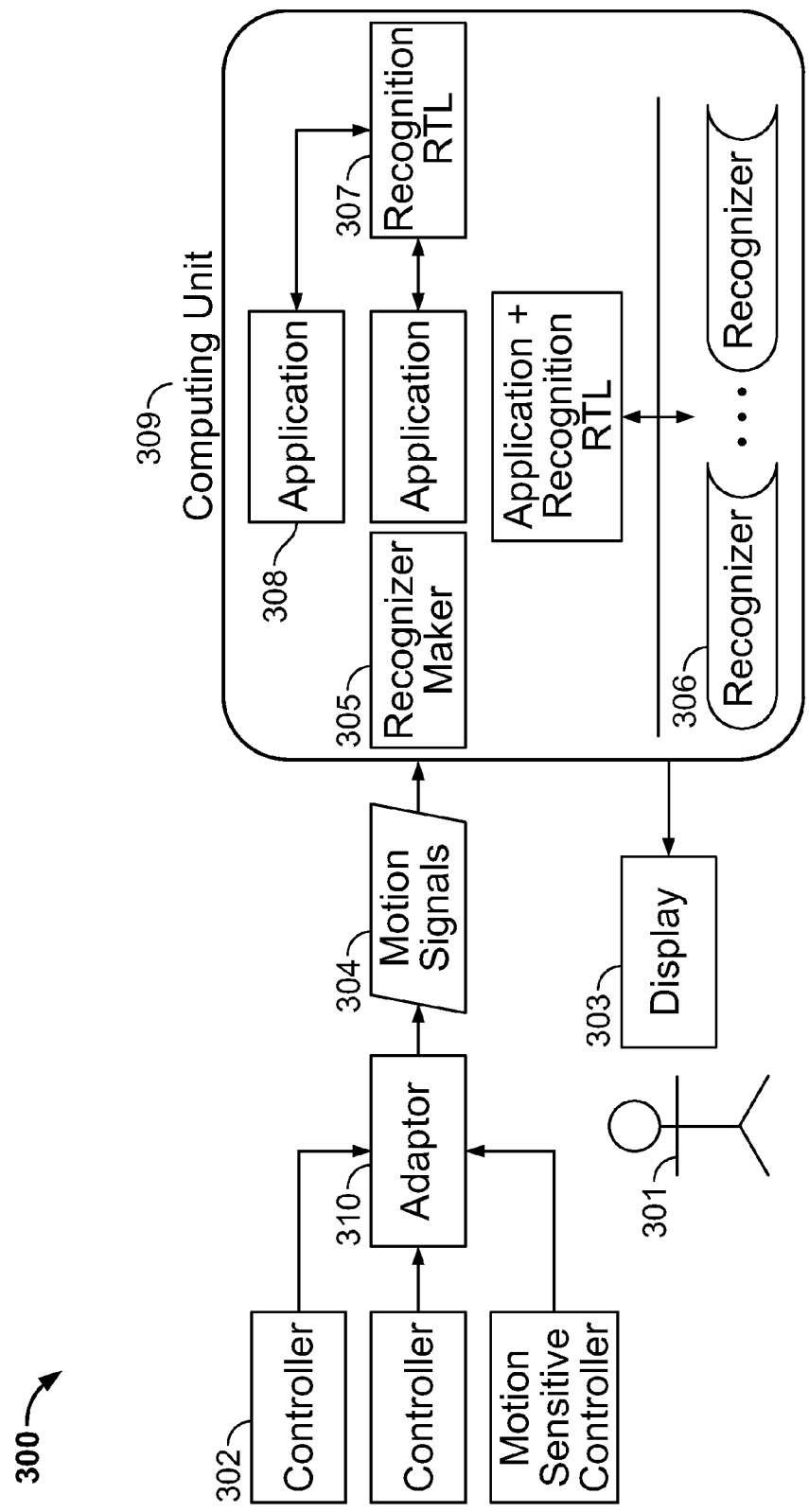
FIG. 3 shows an exemplary configuration in which motion signals are made up of many different inputs measuring various movements and actions of an end user, and are fed into recognizer makers that can build motion recognizers responsive to that data.

FIG. 3 shows a functional block diagram 300 according to an embodiment of this invention. The motion signals 304 are made up of many different signals measuring the movements and actions of the end user 301 holding zero or more motion sensitive devices 302. The signals 304 are passed into a recognizer maker 305 that can build generalized motion recognizers 306 responsive to the motion sensitive devices 302, and may also be passed into motion sensitive applications 308 and a recognition RTL 307. One of the features, benefits and advantages of this embodiment is it provides a capability for the end user to create very general personalized ad-hoc motion recognizers that can be used to recognize motions of many different types, not just motions involving big hand movements.

The motion sensitive devices 302 can include multiple devices of different types for capturing a wide range of end user 301 activities. Raw motion signals from the motion sensitive devices 302 are passed through an adaptor 310 which processes raw signals in different ways (described below) to create the processed motion signals 304. This embodiment hinges on the recognizer maker 305 building motion recognizers 306 that are sensitive to various types of motion signal streams 304, while being ambivalent to the hardware that produces such signals.

The applications 308 may interact directly with an external recognition RTL 307 that may be available for all applications as a service on the computing unit 309, or directly embed a recognition RTL.

Examples of sources of motion signals in this embodiment include one inertial sensing controller in each hand of the one or more end users 301 with outputs that include button presses or joystick movements that may be synchronized with the physical motion in real space, those button presses and joystick movements forming part of the motion signal stream 304.

Examples include web cameras that, with some processing, output the tracked positions and orientations relative to the image plane of the head or shoulders or torso of the end user to make up a portion of the motion signals 304.

Other examples include traces on a touch-sensitive screen, such traces forming part of the motion signals 304. Other examples are certainly possible and should be considered in the purview of this invention. This embodiment hinges on an end user 301 using a recognizer maker 305 that is able to create ad-hoc personalized motion recognizers 306 that are responsive to every component of a collection of motion signals 304 which are composed of a diverse set of data types. The display 303, the recognition RTL 307, the applications 308, and the computing unit 309 are similar in description to their counterparts in embodiment 100 and embodiment 200. The recognizer maker 305 executes a process similar to that described in FIG. 4. The recognition RTL 307 executes a process similar to that described in FIG. 5.

Figure 1B:
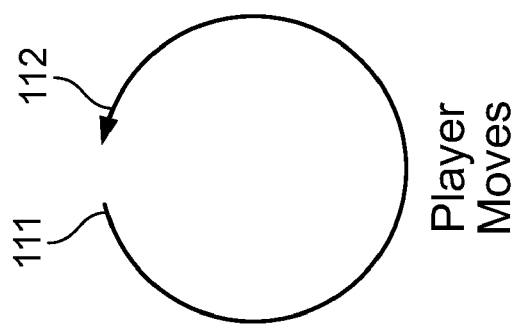
Figure 4:
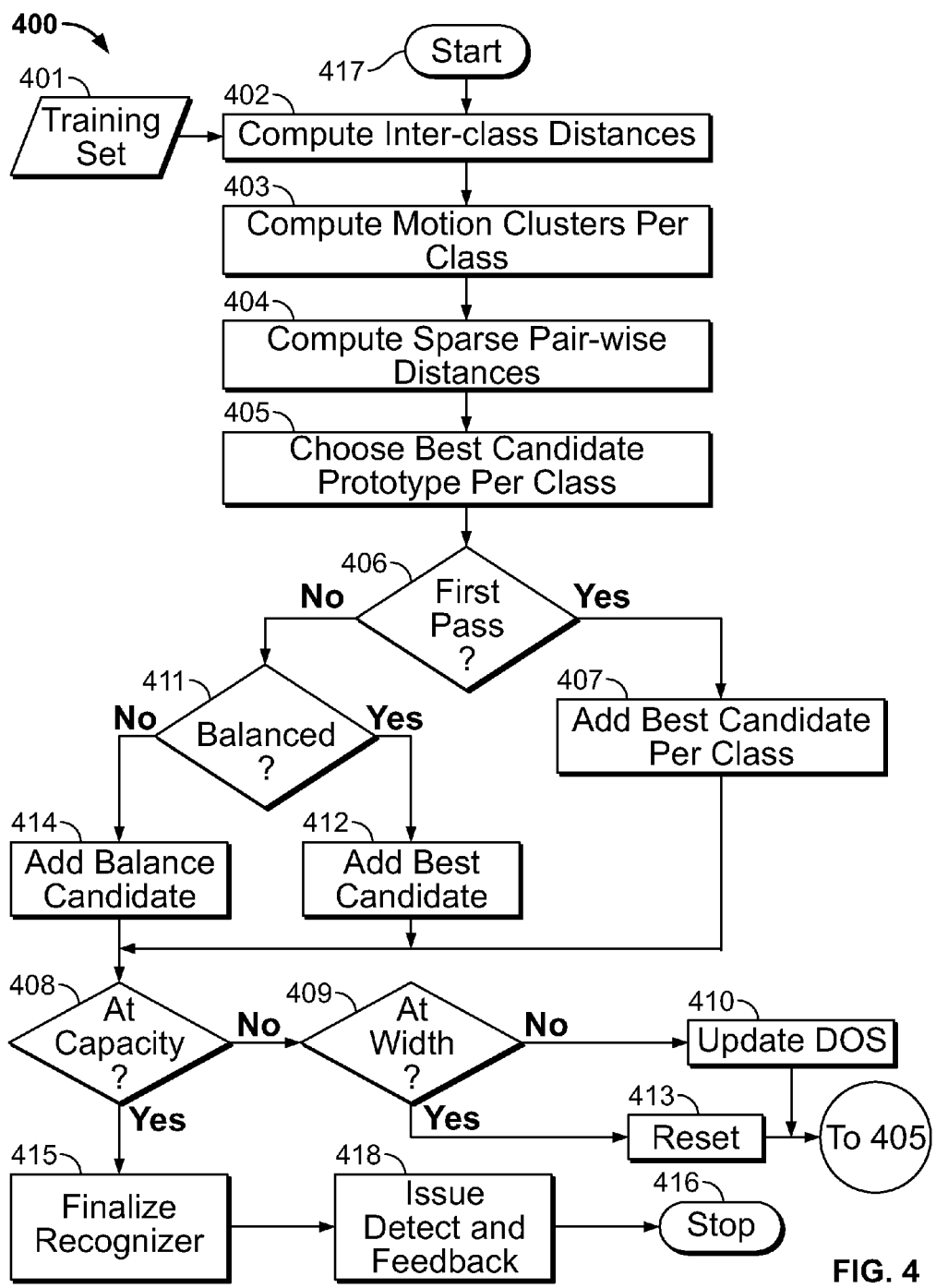
FIG. 4 shows a process of creating personalized ad-hoc motion recognizers according to an embodiment of the invention.

FIG. 4 shows a flowchart, process 400 of creating ad-hoc motion recognizers according to an embodiment of this invention. The process 400 may be implemented in software (e.g., a recognizer maker module as in 105 of FIG. 1), hardware or in a combination of both. One of the features, benefits or advantages of the process 400 is to provide a capability for an end user to create robust ad-hoc motion recognizers on a host computing platform in an online manner (e.g., while the end user waits).

A training set is loaded at 401. The training set comprises one or more classes, each represented by a subset of motion signals that share the same class label, wherein each motion signal is descriptive of the motion of an end user over time. The training set can be created in its entirety from motion examples performed by an end user, or motion examples that an end user chooses to include. Depending on implementation, the motion signals are raw or processed. For the purpose of describing the process 400, it is assumed herein that the motion signals are processed.

Motion recognizer construction requires knowing all pairwise distances between all motion signals in the training set. All pairwise distances are required, but only a fraction need be computed—the rest can be inferred. Computing and storing all pairwise distances is impractical for typical training sets on typical host computing units.

In 402, upon receiving the training set, a recognizer maker begins the process of computing the smallest possible subset of pairwise distances between all motion signals in the training set. Pairwise distances between all substantially different motions belonging to the same class of the training set are computed. In one embodiment, the distance measure (or "cost function") is a unique, a time-warp based measure that assigns some cost to frame-by-frame differences in two motion signals. For the exemplary signal in FIG. 1B, there are 400 frames with 4 floats per frame. This motion may be compared to a second motion with, say 300 frames. There are several cost components in the distance measure, such as differences of first, second and third order derivatives at each point, and different sensitivities to elasticity over time, all of which are weighted and combined differently.

In 403, upon receiving the per-class sets of pairwise distances computed in 402, for each class in the training set clusters of motions are computed based on those distances. The width of each cluster is computed as the maximal distance between two members of the same cluster. A single cluster representative is proposed. Cluster widths are minimized since the clusters are used to infer pairwise distances between motions that were not computed in 402 as being approximately equal to the distances between the cluster representatives.

In 404, the remaining pairwise distances that can't be accurately inferred are computed. First pairwise distances between all cluster representatives in all classes are computed. Then pairwise distances are computed for all members of any two clusters that are likely to be confused with each other as described in detail below. By the end of 404, all pairwise distances have either been computed or inferred, and the process 400 then goes to 405 where prototype selection begins.

The first time 405 is entered, all motion signals in the training set are considered candidates to be prototypes in the motion recognizer being created (e.g., in 415 or finalize recognizers). Each class in the training set must have at least one prototype in the recognizer, no matter what the capacity of the classifier is set to. Each time 405 is entered, the best candidate prototype per class is recomputed. The best candidate is the one that most reduces the degree of separation (DOS) of other members in its class, as described in detail below.

Once the best candidate prototype per class has been computed in 405, a test is performed in 406 to check if this is the first pass of the prototype selection in 405. If so, process 400 goes to 407, where the best candidate per class is added as a prototype in the motion recognizer produced in 415 (or finalize recognizers). Otherwise, only one candidate will be added as a prototype.

If it is not the first pass of the prototype selection (i.e., 406 fails), and the 411 test passes (e.g., the per-class accuracy of the current, incomplete motion recognizer is in balance so that no one class has a recognition performance significantly worse than the second worst), then in 412 the current best overall candidate is added as a prototype to the final recognizer produced in 415. Otherwise, in 414, the candidate for the current worst-performing class is chosen to be added as the next prototype.

Each of functions 407, 408 and 412 will finalize the candidates that were selected as prototypes before process 400 goes to 408. For example, a best classification distance as computed in 405 for a given candidate is set and stored as part of the prototype.

In 408, if the capacity has been reached, process 400 goes to 415 where the recognizer is finalized, and the recognizer maker then terminates at 416. If the capacity has not been reached, a width check is performed at 409. It should be noted that the motion recognizer produced at 415 has been generated entirely by the end user, without restriction on what moves are available and how the end users should execute them.

In 409, a width check is performed. If the remaining candidates all have a DOS of 0, it succeeds. At this point, no more candidates can be added that increase prediction performance on the training set 401. Recommended capacity is set automatically for any given training set as a function of the first few times this width check passes.

When the width check 409 succeeds, in 413 the DOS is recomputed for every remaining candidate, ignoring the effects of the already chosen prototypes, and control passes back to 405. This allows full use of user-selected capacity when creating a motion recognizer. The next set of candidate prototypes will be chosen as though operating on a subsample of the training set 401 in which the already chosen prototypes don't exist. The additional prototypes added after the first pass through 413 tend to significantly improve recognition performance of the finalized recognizer when it is put in practice.

When the width check fails, the DOS for all remaining candidates is updated given the addition of the latest prototypes from 407, 412 or 414, and process 400 goes to 405.

After the recognizer is finalized in 415, process 400 goes to the issue detection and feedback 418. In one embodiment, several issues that may arise during execution of this process 400 are detected and reported back to the end user via a system display (as in embodiment 100 or 200).

Figure 5:
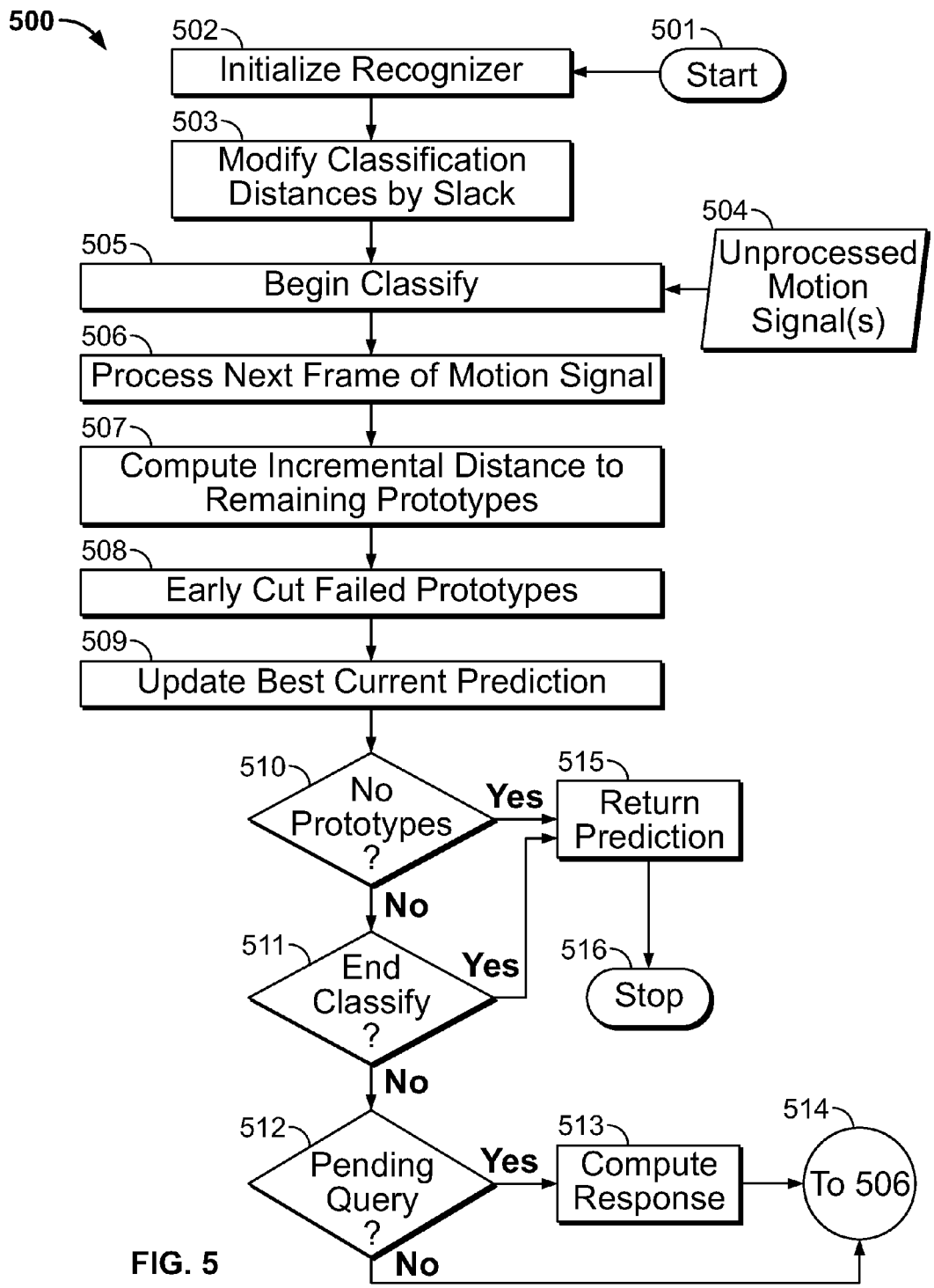
FIG. 5 shows a process of performing motion recognition according to an embodiment of the invention.

In reference to one embodiment of the present invention, FIG. 5 shows a flowchart, process 500 of how motion recognition is carried out by a motion recognition runtime library (RTL) (e.g., the recognition RTL in FIG. 3. 307). One of the features, benefits and advantages of this embodiment is it provides a capability for the end user to use personalized ad-hoc motion recognizers that they've created in a robust, flexible and efficient manner, thus allowing for a much broader range of motion sensitive applications.

In 502 the RTL is initialized by selecting and loading at least one motion recognizer. After initialization, in 503 the classification distances for every prototype in the recognizer are modified as a function of per-class, and possibly per-motion signal type, slack. This results in classification performance that is controllable by an end user, and can be adjusted without modifying the composition of the motion recognizer.

Before beginning classification in 505, a new raw motion signal 504 is attached to the recognition RTL. In practice, there can be multiple distinct motion streams producing motion signals 504, together with multiple distinct computational threads 505-516 running in parallel. For example, the Nintendo Wii has a total of 8 motion sensing controllers, each generating a motion signal 504 that can be recognized in parallel.

Once the recognizer has been initialized and a new raw motion signal has been received, in 505 an application interacting with this process 500 can call "begin classify" for the motion stream 504. A data buffer is shared between the application and the RTL that gives the current recognition thread starting at 505 access to the motion signal 504 as it is being generated, frame by frame. Each update to that data buffer may contain 0, one or more frames of raw motion signal 504 data.

Upon beginning classification, in 506 the currently unprocessed motion signal data is processed one frame at a time. In one embodiment, the processing is done by adaptive filtering wherein much of the raw data is summarized to highlight interesting events in the data before being passed on to 507. "Interesting" may mean summarizing frames where overall speed or acceleration of one or more components of the movement has increased over some threshold, or where a sufficient amount of time has gone by since the last processed point was generated. Additionally, referring to FIG. 1B, those samples before the start sample 114 after the end sample 116 are filtered out. Typically for inertial data, adaptive filtering results in a 50-90% compression of the raw incoming signal. For example, for the exemplary motion in FIG. 1*b*, the 400 frames of raw input might be converted to 40 points of processed input, so that 507 is visited only 40 times.

In 507, once a processed data point is generated from 506, a running distance is updated to every remaining prototype in the recognizer. The distance metric used is the same as in 402 of FIG. 4. In one embodiment, the incremental update of the distance metric is performed with an iterative dynamic programming method.

In 508 an early cut computation is performed for every remaining prototype. This computation checks to see if, given the current running distance to the motion signal 504, the projected best final distance is within the slack-modified classification distance of the prototype. If the answer is no, then the prototype is cut from further consideration until a new "begin classify" signal from the application restarts a new classification thread 505-516.

In 509 the current best prediction is updated. There are many forms a prediction can take. In one embodiment, a prediction is a ranked list of prototypes complete with current progress through each prototype, current confidence in prediction, and current running distance to the motion signal. This is essential to being able to return an "anytime" prediction.

In 510 if there are no prototypes remaining, the current best prediction is returned in 515, and the thread ends in 516. By definition, this prediction will be "undetermined", or "unknown".

If there are prototypes left, and there is a pending "end classify" call 511, control again reverts to 515. In this case, the prediction returned by 515 will be a function of the current best prediction 509, for example, it might be the class of the currently highest-ranked remaining prototype. It might instead be a weighted majority vote of all remaining prototypes in the current best prediction.

If there is not a pending end classify call, a check is made for any other pending queries 512. In one embodiment, queries include "what is the end user recognition score (see lock-in scoring)", "what is the current progress through a given motion", "what is the confidence in the current best guess" and "what is the set of confused moves". Pending queries 512 are resolved in 513 with various computations made from the best current prediction computed in 509. Then in both cases control passes back to 506 where computation pauses while waiting for the next bit of motion signal 504 data to process.

Figure 6:
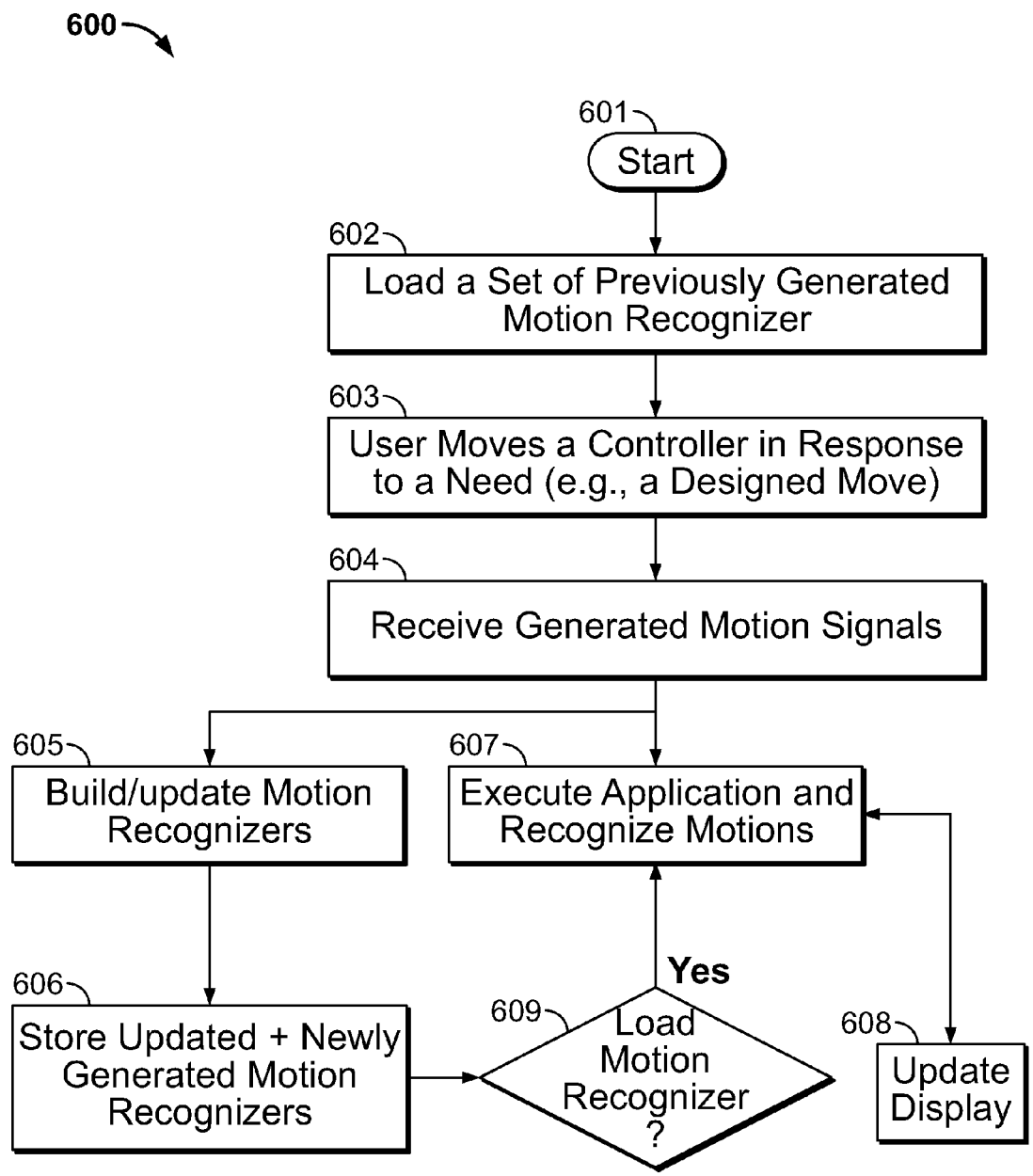
FIG. 6 shows a process of creating ad-hoc personalized motion recognizers while interacting with a motion-sensitive application that is using the same recognizers to provide motion control.

FIG. 6 shows a flowchart, process 600 for creating recognizers while at the same time interacting with a motion-sensitive application that may be using them. The process 600 may be initiated when a user executes an application (e.g., a video game). The process 600 allows an application to be controlled by ad-hoc recognizers that were built by the end user, are personal and unique to that end user, and are possibly built or updated at the same time the application is being executed. One of the features, benefits and advantages of this capability is applications can immediately adapt to an end user giving a sense of intelligence, and end users can have exquisite personalized motion control over their apps.

At 602, the process 600 starts by loading existing motion recognizers that, in one embodiment, may have been generated in accordance with the process 400 of FIG. 4, predefined or preloaded with the application.

The user moves a controller in response to a need at 603. This may be to perform an action for a video game or simply to make a movement from one position to another. As the controller is being moved around, motion signals are received at 604 and coupled by some means to at least two separate modules in parallel: the recognizer maker 605, and the application being executed 607.

At 605, the motion signals, preferably the processed version, are used to build new motion recognizers or update already generated motion recognizers. When there is a new type of motion made by the user and no motion recognizer responsive to it, existing recognizers may be updated to recognize the new type of motion, or a new motion recognizer may be created accordingly. When there is a motion recognizer responsive to the motion made the end user, the motion recognizer may be updated or enhanced to better respond to the motion.

At 606, the updated and newly generated motion recognizers are stored. According to one embodiment, the newly generated motion recognizers can be loaded at 609 to the application 607 being executed in parallel with the build/update 605, and combined with the originally loaded motion recognizers to modify the ongoing motion recognition process. The user continues to move the controller while looking at a display and otherwise interacting with the application. The player's motions are recognized at 607 with whichever motion recognizers are loaded at the time. The display is updated at 608 as the application and the recognizer maker progress, the detail of which is discussed below. In one embodiment, proper feedback is essential in building the motion recognizers.

According to one embodiment, the execute application 607 embeds or otherwise has access to a recognition RTL (e.g. such as in FIG. 3 307). The execute application at 607 operates just as any motion-responsive application would, in that it receives motion signals and receives motion recognition signals and other information from the embedded motion recognition capability, and updates the display at 608 in response to such information.

3 Ad-Hoc Personalized Recognizer Makers for End Users

One embodiment of this invention makes it possible for a member of the general public, in other words not someone who is skilled in the art, to create ad-hoc personalized cross-application motion recognizers. Building robust motion recognizers for dynamic human motion that can recognize a set of predefined motions that must be executed in a specific way is a very challenging task that typically requires significant background knowledge and significant time and effort. Building robust motion recognizers for motions that are not predefined, and can be executed in a manner that is unique and again not predefined, is so far beyond the current state of the art, that most people skilled in the art would be daunted by the prospect, let alone a member of the general public. The preferred embodiment of this invention makes it possible for members of the general public to do exactly this, now.

For an end user to be willing and able to create ad-hoc personalized recognizers, the recognizer maker shall be configured to have the following capabilities: (a) end user motion design issue detection and feedback; (b) fast approximate classifier construction on a host computing unit; and (c) data-driven determination of recognizer parameters. The detail of providing these capabilities will be described below under "End user controls for creating ad-hoc motion recognizers".

Next, the motion recognizers, together with a recognition RTL (e.g., 307 of FIG. 3) are configured to have the following capabilities: (a) any-time best-guess motion recognition; (b) any-time disambiguation tree feedback for application responsiveness; and (c) lock-in based scoring. The detail of these capabilities will be described below under "Providing immediate feedback to the motion sensitive application".

Next yet, the motion recognizers may be generated with a broad range of inputs, including: (a) input types and devices ranging from 3D motion data to button presses to 6D traced paths; (b) corresponding breadth of output response including dual motions, joint motions and other recognition modalities; and (c) a specification interface that provides a device-independent abstraction for the motion signals so that the recognition runtime library is device independent. The detail of these will be described under "Generalized recognition".

3.1 End User Controls for Creating Ad-Hoc Motion Recognizers

One preferred embodiment of this invention delivers the capability of generating ad-hoc motion recognizers directly to the end user by configuring the development time recognizer maker into a runtime end user application that has all the capabilities of the development time software. Significant differences arise when the user of the recognizer maker is an end user, not a professional application developer. For example, there may be less training data from a smaller variety of people, many fewer controls will be accepted by the end user, the host computing platforms are generally less capable, and creation of recognizers must be able to happen while the end user is present—offline "batch" style training has too many disadvantages to be a realistic sole alternative. Parameters that could previously be controlled for by a developer with more background knowledge, skills and time, are now be computed directly from the data. For example, motion recognizers must be able to return "unknown" or "undetermined" for motions that do not match a given motion recognizer, and must do so for ad-hoc motion recognizers without a predefined set of accepted motions and in a manner that "feels right" for most end users. New methods are also described for immediate or constant construction of or tuning-based repair of existing active recognizers on the host computing platform.

3.1.1 End User Move Design Issue Detection and Feedback

A skilled motion control developer tends to benefit from lots of effective feedback and a large, flexible collection of tools, including: an array of debugging facilities; control parameters for fine tuning motion recognizer biases; and tools to help manage subsets of motion examples to create different training and test sets. For the unskilled end user, however, this large collection of debugging aids and control knobs is detrimental. For an end user, two forms of feedback are both highly desirable and sufficient for building personalized ad-hoc recognizers: move confusion detection and feedback, and visual tracking for reminding.

Move confusion detection and feedback. Referring to FIG. 3, while an end user is building a recognizer 306 with the recognizer maker 305, the only type of error that can not be handled by an automatic method is when a move is poorly designed and needs to be changed. This may happen when the moves by an end user are too low in force to be picked up by the controllers 302 (i.e., the sensors therein), or too short to generate a sensible motion signal 304, or of such violent motion that internal sensors in 302 "rail" or max out. In these cases, both the detection and the subsequent feedback are straightforward. The end user must repair the problem by altering his/her move design.

The more challenging problems associated with a poor move design occur when two moves (e.g., two near vertical sword slashes slash180 and slash190) are close enough to each other in motion signal space so as to be problematic. The impact of this can show up in one of several ways.

First, the moves may be confused with each other, in that a slash180 is often misclassified as a slash190. Misclassification can be symmetric wherein both moves are frequently confused with each other. Misclassification can be one-sided as well, wherein slash180 is often confused with slash190, but not vice versa. In this case, according to one embodiment, detection during recognizer construction (process 400) is done by constructing a confusion matrix from subsets of the training set, and processing it looking for hotspots.

| Motions   | allCircle | allCuckoo | allSquare | allHari | allJab |
|-----------|-----------|-----------|-----------|---------|--------|
| allCircle | 660       | 5         | 13        | 0       | 42     |
| allCuckoo | 0         | 425       | 1         | 2       | 3      |
| allSquare | 2         | 10        | 520       | 4       | 9      |
| allHari   | 4         | 6         | 0         | 385     | 25     |
| allJab    | 1         | 10        | 4         | 26      | 299    |

An exemplary confusion matrix is above. For example, the allJab row indicates that of the 320 test jabs, 299 were recognized correctly (the allJab column), 1 was falsely recognized as a circle, 10 as a cuckoo dance, and so on. One hotspot is the allCircle row allJab column indicating that allJab has falsely (and asymmetrically) classified 42 circles as jabs. Reducing the slack on allJabs will help resolve this. Another hotspot is the allJab and allHari cells. The confusion matrix entries (25 and 26) show that these moves are getting confused with one another. In one embodiment, feedback to the end user here is presented as a warning that the moves allJab and allHari are not dependably distinguishable, and that one of them should be changed.

Second, more pernicious, the moves may not be confused with each-other, but instead the classification distances on their prototypes may have shrunk to a degree that it becomes very hard to successfully execute either move. Detection in this case also occurs during the recognizer maker process 400. In one embodiment, a gross expected distribution of classification distances for the distance measure in 402 is computed, and the overall mean for all pairwise distances in the training set is also computed. Finally, the average per-class classification distances are computed and compared with the both the gross distribution and the overall mean. When one or more end user moves have average prototype distance that is unexpectedly small, a warning is created and queued up to be presented to the end user indicating that their move design may need to be changed.

Visual tracking for reminding. A typical use case involves an end user interacting with recognizer makers 305, motion recognizers 306 and motion-sensitive applications 308 over several sessions that may be separated by hours, days or weeks. Unfortunately, detailed physical motion memory is poor for many people. For example, and end user may create a motion recognizer for browsing applications on a handset on a Monday. When they come back to use it on Friday they might have forgotten exactly how they held the controller, or how they executed the move that is meant to allow them to browse the internet.

The approach described herein according to one embodiment is two-fold. The first method is to make user memory (or lack of it) irrelevant by continuously modifying the underlying motion recognizers. In appropriate circumstances, when a user tries to execute a move and fails twice in a row, they are prompted with an option to add the last move to the training set and rebuild the motion recognizer currently in play. The prompt includes a sorted list starting with the most likely class and ending with the least likely class for the last move. The likelihood of each class is determined by comparison to the current best prediction as computed in process 500 509 and choosing which classes are best fits if the slack on each class were increased. The end user agrees to add the motion to the training set and rebuild simply by selecting the label they were hoping to elicit.

The second method is to remind the end user with a visual display of the user's actual tracked movement over time. Providing such a display is feasible in systems where the motion signals 304 are rich enough to provide tracking information. For example, in systems wherein the signals include video, or where the signals include inertial signals that are sufficient to track the position and orientation of a controller 302 over time. In such cases, when the end user queries the recognition RTL in 307, the end user's previous motion and the closest prototype in the sorted list of most likely classes are both reconstructed as a tracked object and presented side by side on the display of the computing unit 309. Each point of divergence in the two moves is highlighted, giving the end user a visual means of remembering what their previous motion examples were. It should be obvious to a person skilled in the art that the exact form the reconstructed motion track takes on is irrelevant to this invention. For example, it could just as easily be a hand holding a motion controller as it could be a disembodied stick figure holding an arrow.

3.1.2 Fast, Approximate Classifier Construction

It is a significant benefit for end user applications to be responsive to commands. In one embodiment, the following three methods are used to build recognizers that are nearly optimal, use minimal CPU and memory resources, and can return an approximate recognizer any-time (e.g. can return a valid result at any point in time, even in the middle of computation).

Online construction with any-time response. The recognizer maker 305 can be running while the example data is incoming, in an online or non-"batch" mode. The preferred embodiment uses an online construction process as in process 400, wherein a new recognizer is continuously under construction on an example by example basis. This granularity-one online construction mode naturally handles cases where all the data that one is likely to get for training often occurs in one session with the one end user. This mode is highly desirable because the end user can demand, and on a reasonable platform receive, the best recognizer given current data, at any point in time.

Adaptive filtering. In system 300, the motion signals 304 are processed in the adaptor 310 before they are coupled to the recognizer maker 305 by adaptively filtering them so that only the interesting portions of the signal remain. The interesting portions for inertial data include, for example, when the relative magnitude of linear or angular accelerations changes beyond a threshold from neighboring samples in a motion, or when the relative magnitude of one or more axes of acceleration has changed beyond a threshold over some period of time, or a relatively large overall time has passed since the last processed sample was generated. The concept of what is interesting is nearly identical for motion signals of other types. The advantages are that (1) processed motion signals are typically much shorter in length (up to 5 times shorter in one embodiment), reducing the computational time associated with both the creation and use of motion recognizers, and (2) classification accuracy improves as irrelevant portions of the signals are removed before classification.

Fractional distance computation. As described in process 400, optimal motion recognizer construction requires all pairwise distances between motion signals in the training set. Computing and accessing this takes as much as 99% of the total memory and CPU requirements of recognizer construction. In the preferred embodiment, only a small fraction of all possible pairs of distances are computed without a noticeable impact on classification accuracy. The vast majority are inferred cheaply. The resulting computation is $O(f(n/c)^2)$ where f is the average length of a motion signal after adaptive filtering, and c is the number of classes or moves in the recognizer. The advantage in typical cases is the end user wait time (and subsequently battery consumption) is several orders of magnitude shorter than otherwise possible.

This method (described briefly in 402-404 of process 400) makes use of the following common property of a metric space: If the distance from A to B (i.e. dAB) is small, and dAC is large, then dBC will be large. When the recognizer maker 305 knows that motion A and motion B are in the same class, and motion C is in a different class, and furthermore knows that dAB is small, and dAC is large, the recognizer maker will not bother to compute dBC in the knowledge that it will not be relevant to good prototype selection for either the class of A, B, or the class of C.

A significant barrier to using this method is that most distance functions that work well for time series data are not well enough behaved to define a metric space, and so inferences as used in 403 and 404 of process 400 based on the property above fails. Specifically, the triangle inequality (dAB+dBC>=dAC) can fail. Conceptually, this is because each of our distance computations is really occurring in a high-dimensional space—the number of samples times the number of motion axes, then being simplified to a single number.

According to one embodiment, the method for fractional distance computations repairs this deficiency by computing enough additional paired distances around the boundaries of likely failures of the triangle inequality to achieve a probably approximately correct result is obtained with high likelihood.

The resulting method is as follows: (1) compute a fraction of all pair-wise distances within a given class; (2) seed a small set of clusters per class, choose a cluster centroid, and assign subsequent training examples to the nearest cluster in their class, or create a new cluster if none are close enough—this requires at least one pair-wise distance calculation between a cluster centroid and an example for each cluster checked; (3) compute all pair-wise distances between all cluster centroids over all classes; and (4) approximate all other pair-wise distances on demand by using their respective cluster centroid distances. When cluster boundaries intersect, or nearly intersect, it is an indication that the triangle inequality is more likely to fail. When that representative distance is not large enough to swamp failures of the triangle inequality, additional distances are computed between members of the two respective clusters. This method succeeds at controllably eliminating the vast majority of required pair-wise time warp distance calculations, at the cost of an occasional suboptimal prototype selection.

3.1.3 Data-Driven Determination of Recognizer Parameters

In one embodiment, three parameters are used for recognizer construction: slack; capacity; and start determination. For example, in the preferred embodiment for U.S. patent application Ser. No. 11/486,997, both slack and capacity were parameters available to the developer, and all motions for the training set were demarcated by button presses thus avoiding the need to detect motion starts with thresholds. To eliminate unnecessary interactions with the end user on technical details of recognizer construction, it is beneficial to set these parameters automatically.

Automatic slack setting. Referring to FIG. 5, slack is used at 503 of process 500 as a multiplier on classification distances for each prototype to control classification tolerances. Each combination of user data, application and move set will lead to different optimal modifications of classification distance. In one embodiment, per-class slack is automatically calculated and set in 411 of FIG. 4 based on optimizing according to the following factors: 1) maximize the overall classification rate over different subsets of the training set; 2) minimize the difference in per-class classification rates; 3) maintain an acceptable rate of undetermined based on a second unrelated set of test motion data; and 4) equalize the confusion between classes (see the "confusion matrix" below). Steps 1 and 2 are described in detail in process 400.

In one embodiment, step 3 is executed during recognizer construction in process 400. As described in FIG. 4, prototypes are added to a motion recognizer in a non-uniform fashion in order to focus on the worst performing moves first. During this phase, each prototype's classification distance is established based initially on a bias that is derived from the time warp distance function, and overridden by classification performance as more data is processed. If the undetermined classification rate using the new motion recognizer on the undetermined test set is out of an acceptable preset range, the per-class slack will be adjusted up or down to push overall recognition back into an acceptable range. The test set used can also be constructed directly from the training set in a leave-one-out fashion. For example, a new training set is constructed by removing one subset of data corresponding to one type of move. A recognizer is built, and the removed move is run through it as a test set. On average, the move should be classified as undetermined with a high rate.

In one embodiment, step 4 is involves computing a confusion matrix at 418 of process 400. The individual per-class slack of any poor performing class is incrementally adjusted up, then tested, while decreasing the slack of classes that are commonly confused with the poorly performing class. This phase ends once per-class differences fall into an acceptable range, or overall classification rates fall out of an acceptable range.

An example of a summarized confusion matrix is below. This shows a high false positive rate for "allGuidedDrop", indicating the classification distance is too high for those prototypes and should be compensated for by automatically setting slack for a lower class.

| Motion | Examples | FalseNegative | FalsePositive |
|---|---|---|---|
| allCircle | 720 | 11.4% | 5.3% |
| allCuckoo | 430 | 10.2% | 8.4% |
| allGuidedDrop | 540 | 6.3% | 35.9% |
| allHari | 400 | 10.8% | 8.8% |
| allJab | 320 | 9.4% | 6.2% |

Automatic capacity setting. Capacity is linearly related to the number of prototypes that are allowed for a given motion recognizer. The more prototypes in a motion recognizer, the more memory and CPU required. Roughly speaking, as capacity grows from zero to infinity, a given application will see classification rates shoot up quickly, level off, and finally begin falling as the recognizer begins to over-fit the training data. Controlling for capacity is required as it directly defines the achievable recognition rates (and thus overall success or failure for the recognition system) for any given motion recognizer, and as it is beneficial to eliminate unnecessary interactions with the end user on technical details concerned with recognizer construction, capacity is set automatically.

In the preferred embodiment as described in process 400 at 405 and 409, prototypes are selected based on a unique computational measure called degree of separation, or DOS. The DOS that a given candidate prototype imparts on an example from the same class is 0 for if there are no examples from a different class that are closer to it, and N if there are N examples from different classes closer. For one candidate, the candidate DOS is the imparted DOS summed over all other candidates in a given class. This is an optimal, fast method to compute a measure of the correct vs. incorrect classifications that the candidate prototype with the given classification distance would make. In one embodiment, capacity is automatically set halfway between the first and second width number as computed at 409 of process 400. As implied, prototypes may subsequently be removed during finalization so that capacity accurately reflects the state of the motion recognizer.

Automatic start determination. Start threshold is a tolerance above which it is determined that a controller 302 is moving (e.g. FIG. 1b points 111 and 114), at which point it is assumed a motion for classification has begun. Start thresholds are vital in the case where there are no external signals to indicate the beginning of a motion, such as a button press, or an in-application "Go!" signal (i.e. "button-less data"). In such cases, any incoming motion signal stream needs to be segmented to determine when to start looking for a motion, and when to stop looking for a motion. It can be beneficial not to require a start button event in an application to detect when a motion has started since many end users find it confusing and unnatural.

In the preferred embodiment, the start determination is calculated by building a start classifier from the training set, wherein the training examples' stored motions have a few additional properties. First, an envelope of data around the official start and end of the motion is recorded (e.g. the samples before 114 and after 116 in FIG. 1*b*). Second, the official start of the motion has been set by an additional process that shows up only while collecting data for training, such as an in-game triggering event like "Go!". Many start classifiers are possible, for example, detecting a force threshold above which the move is officially begun. In the preferred embodiment, the start classifier is built around features of the envelope that are used to differentiate envelope from official motion data, for example, force of acceleration minus gravity. During motion recognition as in process 500, a key feature of this process is that "start" need not be detected on the very first frame a motion has officially begun. Rather, since envelopes around the data are being tracked, features can track several samples on either side of the official start frame, and it is acceptable to determine "start" happened several samples after the fact. In one embodiment, this "start" and "end" marking up of the motion signal stream (i.e. segmenting) is achieved by explicitly marking only the starts of moves, since the recognizer itself is providing the stop detector.

3.1.4 Examples

This invention can take many forms from the point of view of the end user.

For example, motion recognition can be provided as a service that all applications on the computing unit 309 make use of, or it can be baked into every motion sensitive application separately.

For example, the recognizer maker can be built as a separate application on the computing unit, or it can be baked into the motion control service layer 205.

For example, the recognizer maker can always be running in the background on the computing unit, and can take control of the display after every session, when another application completes, to update the feedback for any relevant recognizers.

There are many motion sensing applications that would be made possible with this invention.

For example, application selection on a smart phone can be a motion sensitive application that is baked into the application environment on the computing unit 208. The end user can give examples of each different move he'll make to access each different application on their phone, such as a heart drawn in the air to call their spouse, or circle to call up the browser to do a Google search, and etcetera.

For example, zooming can be done by recognizing the user pulling the controller closer, or further away from her face.

For example, new motion controls can be added to games on the computing unit by simply swapping out the recognizer that was originally shipped with the application to one that the end user created.

For example, browsing on a television can be performed by the end user creating their favorite motions for their favorite TV channels, instead of entering in a 7 and a 6 for channel 76.

3.2 Providing Immediate Feedback to Motion Sensitive Applications

End users expect that applications like computer video games have the ability to give instant and continuous feedback in response to end user inputs like button presses, or motion. The challenge for motion sensitive systems to be able to meet this requirement is that a typical motion, like a cross court forehand in tennis, might take several hundred frames of data to fully execute (e.g. FIG. 1*b* takes 400 frames), but a game running at 60 frames per second would need to begin providing feedback on this motion within 5-8 frames. It is clearly inadequate to wait for all the data to be in before the recognition RTL 203 of FIG. 2 provides a recognition label for the application to use for feedback. What many existing motion sensitive applications do to get around this is to avoid working with ad-hoc motion controls. For example, a one-move control system can trigger as soon as any motion is detected. There are clear benefits and advantages to being able to give immediate feedback to end users using motion sensitive applications with motion controls enabled by ad-hoc personalized motion recognizers.

3.2.1 Anytime Best Guess Motion Recognition

"Anytime best guess" means that a motion sensitive application, after just a part or prefix of the motion signal has been seen (e.g. FIG. 1*b* somewhere between 114 and 116), can ask for and receive the current best guess prediction In process 500 at 509, a confidence measure is computed to predict the likelihood that a current partial motion is a member of every class of the current motion recognizers 306. The confidence measure is an integral part of the current best prediction, which includes a ranked list of labels and confidences. The confidence measure is computed as a function of the current time warp distance from the partial incoming motion data to the best fit to each prototype in the recognizer, weighted by progress through that prototype.

A significant barrier to achieving this is the prototype list may be so large that is not feasible to keep the current best prediction up to date. In one embodiment, a method to overcome this is based on early cut as performed at 508 of process 500. Any prototype whose running time warp distance grows so large that it is unlikely to participate in subsequent classification is cut from further consideration for the remainder of the current incoming motion signal. Specifically, accumulated costs (e.g., time and resources) are monotonically increasing over the length of the prototype and the signal. When the current accumulated cost exceeds a threshold between the prototype and the signal grows larger than the classification distance of the prototype, the prototype has no chance to classify the signal even should the remaining portion of the signal match perfectly. Treating the subsequent cost on the remainder of the prototype as zero would be overly conservative. Instead, a near-perfect match cost based on the remaining size of the prototype is added, and the cut is made if the accumulated cost plus this addition is not within the classification distance. That is, the early cut test passes and the prototype is removed when:

accumulated cost+remainder cost>classification distance.

A key benefit and feature of early cut is that it enables any time best guess predictions for many more players. As time passes, recognizer creation and recognition processes speed because remaining prototypes keep shrinking. For example, a recognizer that begins motion recognition with, say, 200 active prototypes may only have 30 prototypes that survive to the end, meaning the recognition is consuming roughly one seventh of the CPU resources at the end that it was consuming at the beginning. While useful for systems where there is one active motion device being recognized, it is extremely beneficial when there are multiple devices 302 being recognized simultaneously.

For example, the Nintendo Wii can have 8 motion controllers active simultaneously. In the vast majority of cases, these controllers are in different stages of executing different motions. The recognition runtime library 307 may be at the start of processing one motion controller, at the end of processing a second controller, and in the middle of processing the remaining six controllers. With early cut, the recognition RTL 307 is managing all 8 controllers at a constant, probably-dependable (with high, measurable probability) resource cost of managing 2 or 3 controllers.

3.2.2 Disambiguation Trees

Anytime best guess labels are sufficient for many motion sensing applications, and are easy to use. However, they may fail when moves get confused early on. Consider what the motion signals 304 for an inertial controller 302 look like when an end user is tracing out an in-air "2", and an in-air "3". In this case, for the first 50-80% of the motion, whether the motion is a 2 or a 3 simply can not be determined from the data. In such a case, the application would be unable to begin animating for either a "2" or a "3" in a timely manner since they are indistinguishable.

This does not mean, however, that there is no informative feedback for a motion sensing application. In fact, the application can and should begin animating the joint "2-3" move immediately, and only disambiguate to finish with either the "2" or the "3" once enough data is in to do so. A key feature of the embodiment below is to provide such "joint move" or "confusion set" information to the application for use in providing timely appropriate feedback to the user.

In one embodiment, a disambiguation tree is built as part of the feedback 418 of process 400, attached to the recognizer, and is available for querying at 512 of process 500. Internally, the disambiguation tree for a motion recognizer with distinguishable moves is a directed acyclic graph. The start node (i.e., a root) is 0% completion with all moves confused because the moves have not been started. Each leaf node is a single move at whatever percent completion that move is safely determined. For example, the numerals 0-3 may all be confused from 0 to 8% completion, at which point the "1" branches off. The "0" might split off from the "2, 3" at 20% completion, and the "2" and "3" may remain confused until 60% completion. Many move trees may be built for different levels of certainty. For example, one tree for 95% confidence that moves are disambiguated, and another for 80% confidence that moves are disambiguated before branching out from a non-leaf node. When a query is made at 512, the response is the best guess "joint" move given the current state (e.g. the "2, 3" move).

There are several additional benefits for this information, for example this can be used by a motion sensitive application as feedback to the end user to help them understand their move set well enough to know how to repair it. For example, the end user who desires instant response to motion input will know exactly which moves need to be redesigned since the disambiguation tree provides information on exactly which moves stay confused for how long.

An application designer can use the disambiguation tree with either pre-built motion recognizers or ad-hoc recognizers to begin animating immediately even when moves are confused, and to work with the end user in proxy to help ensure the end user builds ad-hoc motion recognizers that fit the application's early animation decisions.

3.2.3 Lock-in Based Scoring

A third form of feedback that is desirable both for the end user and for the motion sensitive application is a score or measure of how well the current motion signal matches a move in the motion recognizer. This information helps the end user improve and remember, and it can facilitate an application to score the performance of the user. A naïve implementation is to match the incoming motion signal to the best prototype and return a percentage of how far within the classification distance of the prototype the current motion is. This method suffers because each time the end user moves, it is likely that a different prototype will be the basis for scoring, and so that the score may increase or decrease from the previous attempt with little regard to how much closer the user got to the last prototype, thus losing some critical information. It would be beneficial to provide a more stable scoring ability to an end user.

In one embodiment, specifically aimed at helping remind and train the end user, the application 206 asks the end user to pick a move that he/she wants to perform better on. The application then asks the end user to perform a couple of attempts at this move, and from these, finds the nearest prototype to these attempts, referring this as the "golden" prototype. From this point the application enters a guidance session where the user performs the move and after each performance, the application scores the motion based on the single golden prototype.

3.2.4 Examples

For example, a computer video game application or mobile game application 206 can use the anytime best guess classification to begin animating immediately in response to end user motions.

For example, the disambiguation tree tells the application the earliest point in time when it is safe to begin animating for a specific set of moves, and when it is safe to commit to a single move.

For example, moves that are initially confused should translate to in-game animations that share the same start. The application can enforce with help of the end user and the disambiguation tree.

For example, lock-in scoring can be used by a computer video game application or mobile game application 206 to score how well the end user does on a move, first giving the end user a few "practice runs" to pick the golden prototype.

For example, the disambiguation tree can identify when it is useful for a computer video game or mobile game application 206 to play an early "start" animation, and when to begin intermediate animations for confused moves.

3.3 Generalized Recognition

The invention concerns ad-hoc personalized motion recognizers for end users, and as such is not specifically limited by intent or by implementation to motion signals 304 that are from self contained inertial sensors on hand-held controllers. Motion recognizers are applicable to a broad range of input. Adding additional independent streams of data to the available motion signals enhances the utility of recognition. For example, a complete motion control system capturing the major elements of human motion control would include a sufficient set of inertial information (e.g., a 3d gyroscope and a 3d accelerometer) from a handheld controller in each hand to track the position and orientation of each controller, LED and button and joystick inputs from the same controllers, as well as position and orientation information for the player's head, shoulders and elbows. In total there are twelve inertial streams, twelve video-related streams, plus several streams of data for the buttons, LEDs and joysticks. Many motion sensitive applications would find it desirable to have access to this more broadband form of communication with their end users.

3.3.1 Wide Variety of Input Types and Devices

In one embodiment, the devices 302 providing the data that gets converted to the motion signals 304 for the recognizer maker include: styluses or fingers for 2D or 3D drawing on touch sensitive screens; buttons, d-pads, triggers and analog sticks on handheld controllers; self contained inertial sensors embedded in handheld controllers; video cameras; scales; microphones; and other devices that can track various components of human motion. A significant barrier to achieving this is how to process different data types to perform recognition and how to register the different streams together to achieve a similar recognition "feel".

In one embodiment, at 310 of FIG. 3, all incoming motion signals are converted to pseudo linear accelerations, pseudo angular velocities or pseudo button presses in the early processing phase. For example, the mapping from the output of a linear accelerometer to a pseudo linear acceleration is 1 to 1; the mapping from the output of an analog trigger on a controller to a pseudo linear acceleration is nearly 1 to 1; and the mapping from a microphone output to a pseudo angular velocity is more involved and involves isolating frequency components. Noise inputs from a microphone can also be roughly treated as a collection of linear accelerations or angular velocities, one per frequency component (this rough approximation is adequate for recognizing many sounds and guttural "gestures" in many application environments).

The recognizer maker in process 400 and the runtime RTL in process 500, as embodied in system 300, both use the motion signals 304 in the same way. Each inertial-related, video-related and position-related stream are first converted to either a velocity or acceleration before being passed to the recognizer maker or runtime RTL. One key benefit is to get away from doing recognition based on positional data. Positional data, even when posed as changes in position relative to a starting point, changes too much too often, and ends up masking the interesting points in time that adaptive filtering can highlight.

Some or all of the above converted inertial, video and positional components of the motion signals 304 are then passed through the recognition framework. For example, twelve inertial signals from controllers in two hands may be composed into twelve-component motions making up a training set. Prototypes will be chosen based on time warp distances as described in process 400, and be used to create a motion recognizer. Then new twelve-component motion signals coming in will be classified by the motion recognizer by computing time warp distances to the prototypes therein, again as described in process 500.

The remaining signals are typically composed of button presses and joystick pushes. Button presses (up and down pulses) are never filtered, and instead are used to trigger "interesting" time points for the adaptive filtering. At the filtering level, joystick inputs are treated much the same way as if they were inertial inputs.

These signals are treated differently whenever a time warp distance calculation (e.g. described at 402 of FIG. 4) is required in constructing or using motion recognizers. In one embodiment, button pulses are scored in a very binary fashion in that, for example, if the "a" key is pushed down in the recognizer, failing to push an "a" in the incoming stream may result in a failed recognition even if the rest of the motion signal is a good match. No partial credit is given for pushing a "b" down in place of the "a".

Furthermore, the ability for the distance metric to overlook time shifts in the input signal (hence the name time warp) is tuned down and modified so that these signals need to match more carefully than the actual physical motions in order to achieve the same recognition rates.

Specifically, in one embodiment, a similar notion to slack is used to change the impact of time warping on specific types of motion signals. Slack is a class-specific modifier of classification distances that makes motions easier or harder to recognize when comparing motions to prototypes. In a similar sense, "elasticity" is a modifier of a portion of the motion signal that controls the relative cost of shifting a signal forwards or backwards in time when comparing motions to prototypes. Typically, the elasticity for inertial signals is relatively high, meaning for example a spike in x acceleration can be shifted quite a bit between prototype and incoming motion before impacting the time warp distance score much. The elasticity for button presses is typically quite low. Therefore, in mixed motion signal cases like this, the time warp distance function is composed of one or more components, each of which has a possibly different sensitivity to shifting signals over time.

3.3.2 Recognition Output Modalities

There are several recognition output modalities that are desirable for motion sensitive applications, especially in cases where the inputs have rich variety. The baseline is for the motion recognizer 306 to recognize the dynamic motion of a user's handheld inertial sensing controller 302. In one embodiment, the recognition RTL 307 can recognize simultaneous independent motions ("parallel motions"), simultaneous dependent motions ("joint motions"), and static poses. All of these are desirable capabilities for an end user working with a motion sensitive application.

Parallel motions are where the motion signals 304 are from two or more separate sources 302, for example one source is an inertial sensing controller in the end user's left hand, one is a controller in the right hand, and the third is the position and orientation of the end user's face. A useful recognition modality is to recognize when both hands are performing some motion while at the same time the head is doing something else. For example, recognize when the end user is nodding their head, while making the motion for a square with their left hand and a circle with their right hand. As long as the motions are occurring at the same time, and as long as each motion is performed up to par, the recognition RTL should recognize the parallel motion. In one embodiment, this is carried out by creating three separate motion recognizers, and running them simultaneously one for the left hand, one for the right hand and one for the head. In another embodiment, parallel motion recognition is performed by having one recognizer per simultaneous motion that is meant to be part of the parallel motion, then allowing the application provide the combined result.

Joint motions involves two or more separate motion sources 302. Joint motion recognition differs from parallel motion recognition in that the motions can not be achieved independently. Imagine threading a needle. Both hands must work together to hold the needle up and to pass the thread through the eye in order to succeed. Obviously, if one held a needle up, then dropped it, then tried to thread with the other hand, they would fail. For example in a game application, the end user may be required to thrust their shield up with one hand at the same time the other hand slashes horizontally in order to carry off a special attack. If the timing were not correct, they would fail. In one embodiment, joint motion recognition is achieved by combining the separate sources 302 into one joined motion signal, and creating one motion recognizer for that combined stream. So, for example, two controllers with 3d accelerometers and 3d gyroscopes effectively becomes one 12d controller from the point of view of the recognition system.

Static poses are a fourth recognition modality wherein the dynamic path of the motion is not of interest. Instead the rest position of the end user is the focus. Providing this capability is straightforward, and simply involves cutting the time series data formed from the motion signals 304 down to just a few frames on either side of the pose, and running the recognition system as already described herein.

3.3.3 Device-Independent Recognition

The preferred embodiment establishes a fixed application programming interface (API) (a standard device-independent motion data API) for applications that abstracts away from details of the devices 302 that are providing the motion signals 304, and provides a registration interface with which the manufacturer or distributer or user of a new device can inform the system of the sufficient statistics of the device. This is an essential element for application developers—the less device fragmentation there is, the broader the abstract platform for a given motion sensitive application. The end user is exposed only indirectly to the benefits of the API in that they can now use a broader range of input devices when interacting with their motion sensitive applications. However, the key benefits and advantages of more motion sensitive applications available on more platforms should be clear.

There are many different inertial sensing devices and video capture devices with a wide range of specifications, error characteristics and capabilities. Operating a device with inertial sensors in location0 based on math and code for a different device with sensors in a different relative location1 can pose serious barriers in many cases.

For recognition, in one embodiment, the motion signals 304 have been processed to remove much of the device-specific characterizations so that within reasonable limits, one type of device can be used to generate a motion recognizer, and a second type of device can be used during play. For example, for a wide range of accelerometers, if the maximum sensitivities and range are known, and the respective locations of the sensor within the rigid controller body are known, the output of two different devices can be mapped to each other without enough information loss to affect recognition.

Device independence must also apply to tracking in a general motion control environment. One example task would be to track the position and orientation of some visible part of the device, in part so that the tracking results can be used as an input to recognition. When tracking a known position on a known device with known sensor locations, a standard approach is to track the location of the sensors over time, then at the end when reporting the results to the user, report the known visible point on the controller's rigid body instead of reporting the actual sensor position. For example, if the sensors are in the center of mass of the controller, first track the position and orientation of the center of mass, then compute the location of the visible point as: Pos−orientation*vecAcc where Pos is the tracked location of the inertial sensors in world frame, orientation is the orientation of the controller, and vecAcc is the location of the inertial sensors relative to the visible point that we are trying to locate.

A more beneficial but challenging problem is to use a motion recognizer unchanged when the device characteristics generating the recognizer differ from the device being recognized (in other words, to transform data from inertial sensors in location1 to act as though they were being generated from a different location2 in the device). The naive approach to transforming the data fails in practice because inertial sensor noise is too strong. The following methods of accounting for sensor noise allow device independent recognition through a standard motion data API to be feasible. The following pseudo-code cutout shows the steps involved in correcting inertial readings from a sensor not located at the center of mass, for which no corrections are needed for angular velocity data if the object is a rigid body, and angular velocity data is used to estimate the readings that would have been measured at the center of mass as follows.

```
LX = accX;
LY = accY;
LZ = accZ;
// Subtract out tangential effects of rotation of accelerometers
around center of mass
LZ −= aaX*yOffset;
LY += aaX*zOffset;
LX −= aaY*zOffset;
LZ += aaY*xOffset;
LY −= aaZ*xOffset;
LX += aaZ*yOffset;
// Centripetal acceleration, move back to acceleration at center of mass
LX += xOffset*(       avY*avY + avZ*avZ);
LY += yOffset*(avX*avX +       avZ*avZ);
LZ += zOffset*(avX*avX + avY*avY       );
// Compensate for gyroscopic effects
LX −= avX*(           avY*yOffset + avZ*zOffset);
LY −= avY*(avX*xOffset +           avZ*zOffset);
LZ −= avZ*(avX*xOffset + avY*yOffset          );
Keys: accX, accY, accZ - linear accelerations measured along each axis
at sensor position
    avX, avY, avZ - angular velocities measured around each axis
    aaX, aaY, aaZ - angular accelerations calculated around each axis
    xOffset, yOffset, zOffset - physical separation between
accelerometers and center of mass
    LX, LY, LZ - calculated linear accelerations for center of mass
Improvements to account for sensor noise:
  1) In practice we find measuring angular acceleration over multiple
periods of sensor data gave smoothed estimates that helped reduce the
effect of noise on the calculated linear accelerations. The number of
readings used varied according to the sampling rate and noise
characteristics of the particular gyroscopes.
    dt = history[endIndex].time − history[startIndex].time;
    aaX = (history[endIndex].avX − history[startIndex].avX)/dt;
    aaY = (history[endIndex].avY − history[startIndex].avY)/dt;
    aaZ = (history[endIndex].avZ − history[startIndex].avZ)/dt;
  2) Angular acceleration was reduced when the corresponding angular
velocity was small. (Most acceleration was found to be a result
of noise in this case)
    // If angular velocity is small, angular accelerations may be due
primarily to the
    // gyro readings jumping between values, yielding jumps of up to
about 5 rad/sec^2
    if ( reduceAA )
    {
      real const aaReduction = 5.0f; // Reduce aa this much at zero
angular velocity (rad/sec/sec)
      real const smallAngularVelocity = 0.5f; // Don't adjust
accelerations if angular velocity above this value (rad/sec)
      moveTowardsZero( aaX, asReduction*(smallAngularVelocity −
fabsf( avX ))/smallAngularVelocity );
```

```
    moveTowardsZero( aaY, aaReduction*(smallAngularVelocity –
fabsf( avY ))/smallAngularVelocity );
    moveTowardsZero( aaZ, aaReduction*(smallAngularVelocity –
fabsf( avZ ))/smallAngularVelocity );
}
```

The mapping can fail if, for example, one accelerometer can not represent high force and the motion set requires high force. Mappings can also fail between devices that are inherently very different in the data they are measuring.

For example, there is no point trying to map joystick pushes onto an accelerometer. Within reasonable limits, however, a straightforward mapping from one component to another abstracts away from the hardware details and in many cases allows cross-device recognition services. All motion signals are tagged with the motion device that generated them. This allows the recognition RTL to map a given motion recognizer 306 to the motion device(s) that are currently generating the motion signals 304 to be classified, wherever such mapping is useful.

3.3.4 Examples

For example, inputs can include motion signals 304 generated from 2D traces on a tablet or a touch-sensitive screen, and could optionally be combined with button presses.

For example, the wide range of inputs and outputs above allow the user to engage in using their upper body to steer (think bob sleds going down a slope), dodge, duck, block, jump, pull, and push their corresponding avatars in computer video games. For example, motion recognition can be retargeted from the human player to avatar in a game of nearly any form, like a gorilla, an ant, a bee, and so on. The main barrier is no longer the control technology, but rather creative limits.

For example, inputs can now come from two or more people, and correlated so that they must perform paired motions at similar times and in complementary ways, such as dancing.

For example, output modalities include using the motion recognizers explicitly to make predictions about end user motions. Clearly the early best guess and early animation feedback is one very specific use of predicting user motion. This capability is, in fact, a general purpose motion prediction capability that can be used for many effects, like for example pretending to read a user's mind in a game.

The present invention has been described in sufficient detail with a certain degree of particularity. It is understood to those skilled in the art that the present disclosure of embodiments has been made by way of examples only and that numerous changes in the arrangement and combination of parts may be resorted without departing from the spirit and scope of the invention as claimed. While the embodiments discussed herein may appear to include some limitations as to the presentation of the information units, in terms of the format and arrangement, the invention has applicability well beyond such embodiment, which can be appreciated by those skilled in the art. Accordingly, the scope of the present invention is defined by the appended claims rather than the forgoing description of embodiments.

We claim:

1. A system for controlling objects in a virtual interactive environment, the system comprising:
    a processing unit, receiving a motion signal from at least one motion sensing device, configured to access a set of prototypes included in a motion recognizer to generate corresponding recognition signals from the motion signal in response to the motion recognizer without considering one or more of the prototypes completely in the motion recognizer, wherein the at least one motion sensing device sends the motion signal responsive to motions made by a user, the recognition signals are continuously generated while the user is making the motions with the motion sensing device; and
    wherein the processing unit causes a display to show the virtual interactive environment, movements of at least one of objects in the virtual interactive environment are responsive to the recognition signals such that feedback from the motions to control the one of the objects is immediate, no matter how much of the motion signal has been received, wherein the feedback is responsive to a measure of progress that has been made through at least one of a current best guess from the motions, and a measure of confidence provided with the current best guess.

2. The system as recited in claim 1, wherein the processing unit, the display and the motion sensing device all reside on a single hand-held device that is responsive to the motions.

3. The system as recited in claim 1, wherein the motion signals responsive to the motions include component outputs from inertial sensors in the motion sensing device, and one or more of (i) buttons, dpads, sticks and triggers on the motion sensing device, (ii) one or more touch screen sensors, (iii) tracked features from video streams describing body part location and orientation information, and (iv) microphones.

4. The system as recited in claim 1, wherein the processing unit is configured to execute a recognition runtime library that computes an early cutoff test between the motion signal and each of the prototypes such that the each of the prototypes is eliminated out of the prototypes from further consideration for the motion signal when the early cutoff test succeeds.

5. The system as recited in claim 1, wherein the processing unit is configured to compute a ranked list of parameters, each of the parameters including a current progress of one of the prototypes being compared with the motion signal, current confidence in prediction of the one of the prototypes to the motion signal, and a current running distance of the one of the prototypes to the motion signal.

6. The system as recited in claim 5, wherein a final recognition signal corresponds to one of the prototypes that is determined from the ranked list of parameters.

7. The system as recited in claim 1, wherein the processing unit is configured to use a disambiguation tree that organizes a collection of sets of moves that are commonly confused with each other at certain points in time, and identify a current node in the disambiguation tree that represents a set of moves that are currently confused with each other given how much of the motion signal has been received so far.

8. The system as recited in claim 7, wherein the processing unit is further configured to allow at least one of the objects in the virtual interactive environment to move in response to a shared predesigned preamble of the set of moves that are currently confused with each other.

9. The system as recited in claim 1, wherein each of the prototypes is represented by a series of data frames, one of the recognition signals is generated from only an initial portion of the series of data frames so that the user feels that the one of the objects reacts almost immediately to the motions made by the user.

10. A method for controlling objects in a virtual interactive environment, the method comprising:
    receiving a motion signal from at least one motion sensing device;

computing, in a processing unit, a motion recognition signal from the motion signal with reference to motion recognizers that are created in advance from a set of training data generated by an end user without reference to a predefined set of allowed motions and without restriction on how to execute motions; and causing one of the objects in the virtual interactive environment to be responsive to the recognition signal which is continuously generated while the user is manipulating the motion sensing device, such that feedback from a motion to control the one of the objects is immediate no matter how much of the motion signal has been received, wherein the feedback is responsive to at least one of a measure of estimated progress and a measure of confidence in a current best guess motion of the user.

11. The method as recited in claim 10, wherein the motion signal responsive to the motions include component outputs from inertial sensors in the motion sensing device, and one or more of (i) buttons, dpads, sticks and triggers on the motion sensing device, (ii) one or more touch screen sensors, (iii) tracked features from video streams describing body part location and orientation information, and (iv) microphones.

12. The method as recited in claim 10, wherein said loading at least a motion recognizer and said generating a recognition signal from the motion signal take place in the motion-sensitive device, the motion-sensitive device includes a display screen to display the virtual interactive environment.

13. The method as recited in claim 10; further comprising: computing a ranked list of parameters, each of the parameters including a current progress of one of the prototypes being compared with the motion signal, current confidence in prediction of the one of the prototypes to the motion signal, and a current running distance of the one of the prototypes to the motion signal.

14. The method as recited in claim 10, wherein the motion recognizer is embedded with a disambiguation tree that is provided to organize a collection of sets of moves that are commonly confused with each other at certain points in time, and the method further comprising:

identifying a current node in the disambiguation tree that represents a set of moves that are currently confused with each other given how much of the motion signal has been received so far; and returning a set of currently confused moves to the application at any point in time before a final recognition signal to the motion signal is determined.

15. The method as recited in claim 14, further comprising causing at least one of the objects in the virtual interactive environment to move in response to a shared predesigned preamble of the set of moves that are currently confused with each other.

16. The method as recited in claim 10, further comprising: executing a recognition runtime library that computes an early cutoff test between the motion signal and each of the prototypes such that the each of the prototypes is eliminated out of the prototypes from further consideration for the motion signal when the early cutoff succeeds.

17. The method as recited in claim 10, further comprising: computing a ranked list of parameters, each of the parameters including a current progress of one of the prototypes being compared with the motion signal, current confidence in prediction of the one of the prototypes to the motion signal, and a current running distance of the one of the prototypes to the motion signal.

18. The method as recited in claim 17, wherein the recognition signal corresponds to one of the prototypes that is determined from the ranked list of parameters.

19. A system for controlling objects in a virtual interactive environment, the system comprising:

a motion sensing device sending out a motion signal responsive to motions made by a user, the motion signal being wirelessly received by a processing unit configured to access a set of prototypes included in a motion recognizer to generate corresponding recognition signals from the motion signal in response to the motion recognizer without considering one or more of the prototypes completely in the motion recognizer, wherein the recognition signals are continuously generated while the user is making the motions with the motion sensing device, and wherein the processing unit causes a display to show the virtual interactive environment, movements of at least one of objects in the virtual interactive environment are responsive to the recognition signals such that feedback from the motions to control the one of the objects is immediate, no matter how much of the motion signal has been received, wherein the feedback is responsive to a measure of progress that has been made through at least one of a current best guess from the motions, and a measure of confidence provided with the current best guess.

20. The system as recited in claim 19, wherein the processing unit is further configured to execute a recognition runtime library that computes an early cutoff test between the motion signal and each of the prototypes such that the each of the prototypes is eliminated out of the prototypes from further consideration for the motion signal when the early cutoff succeeds.

* * * * *

UNITED STATES PATENT AND TRADEMARK OFFICE
CERTIFICATE OF CORRECTION

| | | |
|---|---|---|
| PATENT NO. | : 7,953,246 B1 | Page 1 of 1 |
| APPLICATION NO. | : 12/875146 | |
| DATED | : May 31, 2011 | |
| INVENTOR(S) | : Tu et al. | |

It is certified that error appears in the above-identified patent and that said Letters Patent is hereby corrected as shown below:

On the Title page, Item [60]: Delete "Continuation of application No. 12/709,520, filed on Feb. 22, 2010, which is a continuation-in-part of application No. 11/486,997, filed on Jul. 14, 2006, now Pat. No. 7,702,608." should read as --Continuation of application No, 12/709,520, filed on Feb. 22, 2010, which is a continuation-in-part of application No. 11/486,997, filed on Jul. 14, 2006, now Pat. No. 7,702,608, and a continuation-in-part of application No.: 12/020,431, filed 1/25/2008.--

Signed and Sealed this
Fourth Day of March, 2014

Michelle K. Lee
*Deputy Director of the United States Patent and Trademark Office*